(12) United States Patent
Hinckley et al.

(10) Patent No.: US 8,799,827 B2
(45) Date of Patent: Aug. 5, 2014

(54) PAGE MANIPULATIONS USING ON AND OFF-SCREEN GESTURES

(75) Inventors: Kenneth P. Hinckley, Redmond, WA (US); Koji Yatani, Toronto (CA)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 12/709,376

(22) Filed: Feb. 19, 2010

(65) Prior Publication Data

US 2011/0209099 A1     Aug. 25, 2011

(51) Int. Cl.
*G06F 3/033*     (2013.01)

(52) U.S. Cl.
USPC .......................................... 715/863; 715/864

(58) Field of Classification Search
USPC ................................. 715/863, 864
See application file for complete search history.

(56) References Cited

U.S. PATENT DOCUMENTS

| | | | |
|---|---|---|---|
| 4,686,332 A | 8/1987 | Greanias et al. |
| 4,843,538 A | 6/1989 | Lane et al. |
| 5,231,578 A | 7/1993 | Levin et al. |
| 5,237,647 A | 8/1993 | Roberts et al. |
| 5,351,995 A | 10/1994 | Booker et al. |
| 5,463,725 A | 10/1995 | Henckel et al. |
| 5,491,783 A | 2/1996 | Douglas et al. |
| 5,497,776 A | 3/1996 | Yamazaki et al. |
| 5,511,148 A | 4/1996 | Wellner |
| 5,555,369 A | 9/1996 | Menendez et al. |
| 5,596,697 A | 1/1997 | Foster et al. |
| 5,661,773 A | 8/1997 | Swerdloff et al. |
| 5,664,128 A | 9/1997 | Bauer |
| 5,694,150 A | 12/1997 | Sigona et al. |
| 5,731,813 A | 3/1998 | O'Rourke et al. |
| 5,761,485 A | 6/1998 | Munyan |
| 5,817,019 A | 10/1998 | Kawashima |
| 5,821,930 A | 10/1998 | Hansen |
| 5,838,889 A | 11/1998 | Booker et al. |
| 5,898,434 A | 4/1999 | Small et al. |
| 5,969,720 A | 10/1999 | Lisle et al. |
| 6,029,214 A | 2/2000 | Dorfman et al. |
| 6,037,937 A | 3/2000 | Beaton et al. |

(Continued)

FOREIGN PATENT DOCUMENTS

| | | |
|---|---|---|
| CN | 1326564 | 12/2001 |
| CN | 1766824 | 5/2006 |

(Continued)

OTHER PUBLICATIONS (Roth et al., Bezel Swipe: Conflict-Free Scrolling and Multiple Selection on Mobile Touch Screen Devices; pp. 1-4 © 2009).*

(Continued)

*Primary Examiner* — Omar Abdul-Ali
*Assistant Examiner* — Sherrod Keaton
(74) *Attorney, Agent, or Firm* — Micah Goldsmith; Glen Johnson; Micky Minhas

(57) ABSTRACT

Bezel gestures for touch displays are described. In at least some embodiments, the bezel of a device is used to extend functionality that is accessible through the use of so-called bezel gestures. In at least some embodiments, off-screen motion can be used, by virtue of the bezel, to create screen input through a bezel gesture. Bezel gestures can include single-finger bezel gestures, multiple-finger/same-hand bezel gestures, and/or multiple-finger, different-hand bezel gestures.

20 Claims, 33 Drawing Sheets

(56) References Cited

U.S. PATENT DOCUMENTS

| | | | |
|---|---|---|---|
| 6,061,061 A | 5/2000 | Conrad et al. | |
| 6,072,476 A | 6/2000 | Harada et al. | |
| 6,097,392 A | 8/2000 | Leyerle | |
| 6,115,724 A | 9/2000 | Booker et al. | |
| 6,167,439 A | 12/2000 | Levine et al. | |
| 6,239,798 B1 | 5/2001 | Ludolph et al. | |
| 6,310,610 B1 | 10/2001 | Beaton et al. | |
| 6,340,979 B1 | 1/2002 | Beaton et al. | |
| 6,396,523 B1 | 5/2002 | Segal et al. | |
| 6,507,352 B1 | 1/2003 | Cohen et al. | |
| 6,525,749 B1 | 2/2003 | Moran et al. | |
| 6,545,669 B1* | 4/2003 | Kinawi et al. | 345/173 |
| 6,859,909 B1* | 2/2005 | Lerner et al. | 715/203 |
| 6,920,619 B1 | 7/2005 | Milekic | |
| 7,023,427 B2 | 4/2006 | Kraus et al. | |
| 7,053,887 B2 | 5/2006 | Kraus et al. | |
| 7,295,191 B2 | 11/2007 | Kraus et al. | |
| 7,454,717 B2 | 11/2008 | Hinckley et al. | |
| 7,479,949 B2 | 1/2009 | Jobs | |
| 7,506,269 B2 | 3/2009 | Lang | |
| 7,532,196 B2 | 5/2009 | Hinckley | |
| 7,636,071 B2 | 12/2009 | O'Gorman | |
| 7,656,393 B2* | 2/2010 | King et al. | 345/173 |
| 7,676,767 B2 | 3/2010 | Hofmeister et al. | |
| 7,760,187 B2 | 7/2010 | Kennedy | |
| 7,821,780 B2 | 10/2010 | Choy | |
| D631,043 S | 1/2011 | Kell | |
| 7,956,847 B2 | 6/2011 | Christie | |
| 8,102,858 B1 | 1/2012 | Rahim et al. | |
| 8,212,788 B2 | 7/2012 | Lam | |
| 8,239,785 B2 | 8/2012 | Hinckley et al. | |
| 8,261,213 B2 | 9/2012 | Hinckley | |
| 8,289,289 B2 | 10/2012 | Rimon et al. | |
| 8,294,669 B2 | 10/2012 | Partridge et al. | |
| 8,327,295 B2 | 12/2012 | Ikeda et al. | |
| 8,373,660 B2 | 2/2013 | Pallakoff | |
| 8,473,870 B2 | 6/2013 | Hinckley et al. | |
| 8,539,384 B2 | 9/2013 | Hinckley et al. | |
| 8,587,526 B2 | 11/2013 | Engelhardt et al. | |
| 8,707,174 B2 | 4/2014 | Hinckley et al. | |
| 8,751,970 B2 | 6/2014 | Hinckley et al. | |
| 2001/0012000 A1 | 8/2001 | Eberhard | |
| 2001/0035860 A1 | 11/2001 | Segal et al. | |
| 2001/0047263 A1 | 11/2001 | Smith et al. | |
| 2002/0060701 A1 | 5/2002 | Naughton et al. | |
| 2002/0097229 A1 | 7/2002 | Rose et al. | |
| 2002/0101457 A1 | 8/2002 | Lang | |
| 2002/0116421 A1 | 8/2002 | Fox et al. | |
| 2003/0098858 A1 | 5/2003 | Perski et al. | |
| 2003/0179541 A1 | 9/2003 | Sullivan | |
| 2003/0231219 A1 | 12/2003 | Leung | |
| 2004/0001048 A1 | 1/2004 | Kraus et al. | |
| 2004/0155871 A1 | 8/2004 | Perski et al. | |
| 2004/0236774 A1 | 11/2004 | Baird et al. | |
| 2004/0255254 A1 | 12/2004 | Weingart et al. | |
| 2005/0012723 A1* | 1/2005 | Pallakoff | 345/173 |
| 2005/0017959 A1 | 1/2005 | Kraus et al. | |
| 2005/0052432 A1 | 3/2005 | Kraus et al. | |
| 2005/0101864 A1 | 5/2005 | Zheng et al. | |
| 2005/0129314 A1 | 6/2005 | Chen | |
| 2005/0184973 A1 | 8/2005 | Lum et al. | |
| 2005/0189154 A1 | 9/2005 | Perski et al. | |
| 2005/0198592 A1 | 9/2005 | Keely, Jr. et al. | |
| 2006/0001650 A1 | 1/2006 | Robbins et al. | |
| 2006/0010371 A1 | 1/2006 | Shur et al. | |
| 2006/0012580 A1 | 1/2006 | Perski et al. | |
| 2006/0012581 A1 | 1/2006 | Haim et al. | |
| 2006/0022955 A1 | 2/2006 | Kennedy | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0031786 A1 | 2/2006 | Hillis et al. | |
| 2006/0092177 A1* | 5/2006 | Blasko | 345/619 |
| 2006/0093219 A1 | 5/2006 | Gounares et al. | |
| 2006/0101354 A1 | 5/2006 | Hashimoto et al. | |
| 2006/0161870 A1 | 7/2006 | Hotelling et al. | |
| 2006/0197750 A1 | 9/2006 | Kerr et al. | |
| 2006/0238517 A1 | 10/2006 | King et al. | |
| 2006/0238520 A1 | 10/2006 | Westerman et al. | |
| 2006/0262188 A1 | 11/2006 | Elyada et al. | |
| 2007/0075976 A1 | 4/2007 | Kun et al. | |
| 2007/0097096 A1 | 5/2007 | Rosenberg | |
| 2007/0106939 A1 | 5/2007 | Qassoudi | |
| 2007/0109274 A1 | 5/2007 | Reynolds | |
| 2007/0120762 A1 | 5/2007 | O'Gorman | |
| 2007/0146347 A1 | 6/2007 | Rosenberg | |
| 2007/0150496 A1 | 6/2007 | Feinsmith | |
| 2007/0168890 A1 | 7/2007 | Zhao et al. | |
| 2007/0171211 A1 | 7/2007 | Perski et al. | |
| 2007/0236468 A1 | 10/2007 | Tuli | |
| 2007/0242056 A1 | 10/2007 | Engelhardt et al. | |
| 2008/0001924 A1 | 1/2008 | de los Reyes et al. | |
| 2008/0005703 A1 | 1/2008 | Radivojevic et al. | |
| 2008/0036743 A1 | 2/2008 | Westerman | |
| 2008/0040692 A1 | 2/2008 | Sunday et al. | |
| 2008/0042978 A1 | 2/2008 | Perez-Noguera | |
| 2008/0046425 A1 | 2/2008 | Perski | |
| 2008/0052945 A1 | 3/2008 | Matas et al. | |
| 2008/0062141 A1 | 3/2008 | Chandhri | |
| 2008/0065720 A1 | 3/2008 | Brodersen et al. | |
| 2008/0082903 A1 | 4/2008 | McCurdy et al. | |
| 2008/0084400 A1 | 4/2008 | Rosenberg | |
| 2008/0164982 A1 | 7/2008 | Andrews et al. | |
| 2008/0165141 A1 | 7/2008 | Christie | |
| 2008/0165255 A1 | 7/2008 | Christie et al. | |
| 2008/0168396 A1* | 7/2008 | Matas et al. | 715/840 |
| 2008/0168403 A1 | 7/2008 | Westerman et al. | |
| 2008/0180404 A1 | 7/2008 | Han et al. | |
| 2008/0211766 A1 | 9/2008 | Westerman et al. | |
| 2008/0211778 A1 | 9/2008 | Ording et al. | |
| 2008/0218494 A1 | 9/2008 | Perski et al. | |
| 2008/0229192 A1 | 9/2008 | Gear et al. | |
| 2008/0249682 A1 | 10/2008 | Wisniewski et al. | |
| 2008/0278455 A1 | 11/2008 | Atkins et al. | |
| 2008/0303798 A1 | 12/2008 | Matsudate et al. | |
| 2009/0019188 A1 | 1/2009 | Mattice et al. | |
| 2009/0033632 A1 | 2/2009 | Szolyga et al. | |
| 2009/0054107 A1 | 2/2009 | Feland, III et al. | |
| 2009/0058830 A1 | 3/2009 | Herz | |
| 2009/0059730 A1 | 3/2009 | Lyons et al. | |
| 2009/0077501 A1 | 3/2009 | Partridge et al. | |
| 2009/0079699 A1 | 3/2009 | Sun | |
| 2009/0094562 A1 | 4/2009 | Jeong et al. | |
| 2009/0096758 A1 | 4/2009 | Hotelling et al. | |
| 2009/0117943 A1 | 5/2009 | Lee et al. | |
| 2009/0128505 A1 | 5/2009 | Partridge et al. | |
| 2009/0138830 A1 | 5/2009 | Borgaonkar et al. | |
| 2009/0143141 A1 | 6/2009 | Wells et al. | |
| 2009/0153289 A1 | 6/2009 | Hope et al. | |
| 2009/0153438 A1 | 6/2009 | Miller et al. | |
| 2009/0167696 A1 | 7/2009 | Griffin | |
| 2009/0167702 A1 | 7/2009 | Nurmi | |
| 2009/0193366 A1 | 7/2009 | Davidson | |
| 2009/0217211 A1 | 8/2009 | Hildreth et al. | |
| 2009/0249236 A1 | 10/2009 | Westerman et al. | |
| 2009/0251432 A1 | 10/2009 | Wang et al. | |
| 2009/0251434 A1 | 10/2009 | Rimon et al. | |
| 2009/0276701 A1 | 11/2009 | Nurmi | |
| 2009/0282332 A1 | 11/2009 | Porat | |
| 2009/0284478 A1 | 11/2009 | De la Torre Baltierra | |
| 2009/0295753 A1 | 12/2009 | King et al. | |
| 2009/0307589 A1 | 12/2009 | Inose et al. | |
| 2009/0309846 A1 | 12/2009 | Trachtenberg et al. | |
| 2009/0320070 A1 | 12/2009 | Inoguchi | |
| 2009/0327975 A1 | 12/2009 | Stedman | |
| 2010/0013768 A1 | 1/2010 | Leung | |
| 2010/0016049 A1 | 1/2010 | Shirakawa et al. | |
| 2010/0020025 A1 | 1/2010 | Lemort et al. | |
| 2010/0045705 A1 | 2/2010 | Vertegaal et al. | |
| 2010/0050076 A1 | 2/2010 | Roth | |
| 2010/0053861 A1 | 3/2010 | Kim et al. | |
| 2010/0066667 A1 | 3/2010 | MacDougall et al. | |
| 2010/0079392 A1 | 4/2010 | Chiang et al. | |
| 2010/0081475 A1 | 4/2010 | Chiang et al. | |

(56) References Cited

U.S. PATENT DOCUMENTS

| | | |
|---|---|---|
| 2010/0083154 A1 | 4/2010 | Takeshita |
| 2010/0083190 A1 | 4/2010 | Roberts et al. |
| 2010/0088641 A1 | 4/2010 | Choi |
| 2010/0090971 A1* | 4/2010 | Choi et al. ............... 345/173 |
| 2010/0097338 A1 | 4/2010 | Miyashita et al. |
| 2010/0105443 A1* | 4/2010 | Vaisanen ............... 455/566 |
| 2010/0107067 A1 | 4/2010 | Vaisanen |
| 2010/0115455 A1 | 5/2010 | Kim |
| 2010/0134415 A1 | 6/2010 | Iwase et al. |
| 2010/0137027 A1 | 6/2010 | Kim |
| 2010/0164878 A1 | 7/2010 | Bestle et al. |
| 2010/0164959 A1 | 7/2010 | Brown et al. |
| 2010/0188371 A1 | 7/2010 | Lowles et al. |
| 2010/0201634 A1 | 8/2010 | Coddington |
| 2010/0213040 A1 | 8/2010 | Yeh et al. |
| 2010/0217428 A1 | 8/2010 | Strong et al. |
| 2010/0241973 A1* | 9/2010 | Whiddett ............... 715/762 |
| 2010/0245263 A1 | 9/2010 | Parada, Jr. et al. |
| 2010/0251189 A1 | 9/2010 | Jaeger |
| 2010/0262928 A1 | 10/2010 | Abbott |
| 2010/0283748 A1 | 11/2010 | Hsieh et al. |
| 2010/0295795 A1 | 11/2010 | Wilairat |
| 2010/0302172 A1 | 12/2010 | Wilairat |
| 2010/0306702 A1 | 12/2010 | Warner |
| 2010/0313124 A1 | 12/2010 | Privault et al. |
| 2011/0018821 A1 | 1/2011 | Kii |
| 2011/0041096 A1 | 2/2011 | Larco et al. |
| 2011/0050594 A1 | 3/2011 | Kim et al. |
| 2011/0055729 A1 | 3/2011 | Mason et al. |
| 2011/0055753 A1* | 3/2011 | Horodezky et al. ........... 715/810 |
| 2011/0107220 A1 | 5/2011 | Perlman |
| 2011/0115735 A1 | 5/2011 | Lev et al. |
| 2011/0117526 A1 | 5/2011 | Wigdor et al. |
| 2011/0126094 A1 | 5/2011 | Horodezky et al. |
| 2011/0143769 A1 | 6/2011 | Jones et al. |
| 2011/0167336 A1 | 7/2011 | Aitken et al. |
| 2011/0181524 A1 | 7/2011 | Hinckley |
| 2011/0185299 A1 | 7/2011 | Hinckley |
| 2011/0185300 A1 | 7/2011 | Hinckley |
| 2011/0185318 A1 | 7/2011 | Hinckley |
| 2011/0185320 A1 | 7/2011 | Hinckley |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0205163 A1 | 8/2011 | Hinckley |
| 2011/0209039 A1 | 8/2011 | Hinckley |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley |
| 2011/0209093 A1 | 8/2011 | Hinckley |
| 2011/0209097 A1 | 8/2011 | Hinckley |
| 2011/0209098 A1 | 8/2011 | Hinckley |
| 2011/0209100 A1 | 8/2011 | Hinckley |
| 2011/0209101 A1 | 8/2011 | Hinckley |
| 2011/0209102 A1 | 8/2011 | Hinckley |
| 2011/0209103 A1 | 8/2011 | Hinckley |
| 2011/0209104 A1 | 8/2011 | Hinckley |
| 2011/0231796 A1 | 9/2011 | Vigil |
| 2011/0291964 A1 | 12/2011 | Chambers et al. |
| 2012/0084705 A1 | 4/2012 | Lee et al. |
| 2012/0096411 A1 | 4/2012 | Nash |
| 2012/0236026 A1 | 9/2012 | Hinckley |

FOREIGN PATENT DOCUMENTS

| | | |
|---|---|---|
| CN | 101432677 | 5/2009 |
| CN | 201298220 | 8/2009 |
| CN | 101566865 | 10/2009 |
| CN | 101576789 | 11/2009 |
| CN | 101627361 | 1/2010 |
| CN | 101636711 | 1/2010 |
| EP | 1942401 | 7/2008 |
| EP | 2148268 | 1/2010 |
| JP | 6282368 | 10/1994 |
| JP | 7281810 | 10/1995 |
| JP | 2001265523 | 9/2001 |
| JP | 2001290585 | 10/2001 |
| JP | 2008305087 | 12/2008 |
| JP | 2009097724 | 4/2009 |
| JP | 2010250465 | 11/2010 |
| KR | 20090013927 | 2/2009 |
| KR | 1020090088501 | 8/2009 |
| KR | 20090106755 | 10/2009 |
| TW | 200947297 | 11/2009 |
| WO | WO-9928812 | 1/1999 |
| WO | WO-2009086628 | 7/2009 |
| WO | WO-2011106467 | 9/2011 |
| WO | WO-2011106468 | 9/2011 |

OTHER PUBLICATIONS

Elliott, Matthew "First Dell, Then HP: What's Next for N-trig's Multitouch Screen Technology", Retrieved from: <http://news.cnet.com/8301-17938_105-10107886-1.html> on Nov. 11, 2009, (Nov. 25, 2008),5 pages.

Appleinsider, "Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, (Oct. 26, 2006), 10 pages.

Emigh, Jacqueline "Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, (Sep. 15, 2009),3 pages.

Roth, Volker et al., "Bezel Swipe: Conflict-Free Scrolling and Multiple Selection on Mobile Touch Screen Devices", *CHI 2009*, Available at <http://www.volkerroth.com/download/Roth2009a.pdf>,(Apr. 2009),4 pages.

Pierce, Jeffrey S., et al., "Toolspaces and Glances: Storing, Accessing, and Retrieving Objects in 3D Desktop Applications", *1999 Symposium on Interactive 3D Graphics*, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>,(Apr. 1999),pp. 163-168.

"Apple Unibody MacBook Pro #MB991LL/A 2.53 GHz Intel Core 2 Duo", Retrieved from: <http://www.themacstore.com/parts/show/c-nmb3-mb991ll_a> on Nov. 10, 2009, (2009), 12 pages.

"Dell and Windows 7—The Wait Is Over", Retrieved from: <http://content.dell.com/us/en/corp/d/press-releases/2009-10-22-Dell-and-Windows-7.aspx> on Nov. 10, 2009, (Oct. 22, 2009),2 pages.

"New MS Courier Leak Details Multi-Touch Interface", Retrieved from: <http://www.electronista.com/articles/09/11/04/courier.gestures.ui.explained/> on Nov. 10, 2009 (Nov. 4, 2009),9 pages.

Brandl, Peter et al., "Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories,(May 2008), 10 pages.

Daniels, Martyn "Brave New World", Retrieved from: <http://bookseller-association.blogspot.com/2009_03_01_archive.html> on Nov. 10, 2009, (Mar. 2009),54 pages.

Gross, Mark D., "Stretch-A-Sketch: A Dynamic Diagrammer", *IEEE Symposium on Visual Languages*, Available at <http://depts.washington.edu/dmachine/PAPER/VL94/vl.html>,(Oct. 1994), 11 pages.

Hinckley, Ken et al., "Codex: A Dual Screen Tablet Computer", *Conference on Human Factors in Computing Systems*, Available at <http://research.microsoft.com/en-us/um/people/kenh/codex-chi-2009-with-authors.pdf>,(2009), 10 pages.

Hinckley, Ken et al., "Stitching: Pen Gestures that Span Multiple Displays", *CHI 2004*, Available at <http://www.cs.cornell.edu/~francois/Papers/2004-Hinckley-AVI04-Stitching.>,(2004),pp. 1-8.

(56) References Cited

OTHER PUBLICATIONS

Krazit, Tom "Has Apple Found the Magic Touch?", Retrieved from: <http://news.cnet.com/8301-13579_3-9879471-37.html> on Nov. 10, 2009, (Feb. 26, 2008),2 pages.

Minsky, Margaret R., "Manipulating Simulated Objects with Real-world Gestures using a Force and Position Sensitive Screen", *Computer Graphics*, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>,(Jul. 1984),pp. 195-203.

Olwal, Alex et al., "Rubbing and Tapping for Precise and Rapid Selection on Touch-Screen Displays", *Conference on Human Factors in Computing Systems*, Available at <http://www.csc.kth.se/~alx/projects/research/rubbing/olwal_rubbing_tapping_chi_2008.pdf>,(Apr. 2008), 10 pages.

Yee, Ka-Ping "Two-Handed Interaction on a Tablet Display", Retrieved from: <http://zesty.ca/tht/yee-tht-chi2004-short.pdf>, Conference on Human Factors in Computing Systems,(Apr. 2004),4 pages.

"Final Office Action", U.S. Appl. No. 12/709,245, (Jan. 6, 2012),13 pages.

"iQuery & Css Example—Dropdown Menu", *DesignReviver*, Retrieved from: <http://designreviver.com/tutorials/jquery-css-example-dropdown-menu/> on Nov. 22, 2011,(Oct. 7, 2008),30 pages.

"Non-Final Office Action", U.S. Appl. No. 12/700,460, (Jan. 13, 2012),21 pages.

"Non-Final Office Action", U.S. Appl. No. 12/709,245, (Nov. 30, 2011),11 pages.

"Non-Final Office Action", U.S. Appl. No. 12/709,301, (Nov. 28, 2011),9 pages.

"Non-Final Office Action", U.S. Appl. No. 12/709,348, (Dec. 7, 2011), 12 pages.

"Non-Final Office Action", U.S. Appl. No. 12/713,081, (Dec. 23, 2011), 18 pages.

"Non-Final Office Action", U.S. Appl. No. 12/713,113, (Dec. 22, 2011),20 pages.

"Non-Final Office Action", U.S. Appl. No. 12/713,127, (Dec. 27, 2011),22 pages.

"Non-Final Office Action", U.S. Appl. No. 12/713,130, (Jan. 23, 2012),7 pages.

"PCT Search Report and Written Opinion", Application No. PCT/US2011/025131, (Oct. 31, 2011), 10 pages.

"PCT Search Report and Written Opinion", Application No. PCT/US2011/025974, (Oct. 26, 2011),8 pages.

"PCT Search Report and Written Opinion", Application No. PCT/US2011/025973, (Oct. 27, 2011), 13 pages.

Vigil, Jose M., "Methods for Controlling a Floating Cursor on a Multi-touch Mobile Phone or Tablet in Conjunction with Selection Gestures and Content Gestures", U.S. Appl. No. 61/304,972, filed Feb. 16, 2010,54 pages.

"Final Office Action", U.S. Appl. No. 12/695,937, (Jul. 26, 2012), 13 pages.

"Final Office Action", U.S. Appl. No. 12/709,301, (Mar. 1, 2012), 11 pages.

"Final Office Action", U.S. Appl. No. 12/709,348, (Feb. 17, 2012), 13 pages.

"Final Office Action", U.S. Appl. No. 12/713,081, (May 9, 2012), 19 pages.

"Final Office Action", U.S. Appl. No. 12/713,113, (Jun. 4, 2012), 18 pages.

"Final Office Action", U.S. Appl. No. 12/713,127, (Jun. 6, 2012), 18 pages.

"Final Office Action", U.S. Appl. No. 12/713,130, (Jun. 29, 2012),8 pages.

"Final Office Action", U.S. Appl. No. 12/713,133, (Jul. 2, 2012),8 pages.

"Non-Final Office Action", U.S. Appl. No. 12/695,937, (Apr. 25, 2012), 14 pages.

"Non-Final Office Action", U.S. Appl. No. 12/700,357, (Jul. 2, 2012), 10 pages.

"Non-Final Office Action", U.S. Appl. No. 12/700,510, (Feb. 7, 2012),20 pages.

"Non-Final Office Action", U.S. Appl. No. 12/709,204, (May 10, 2012),20 pages.

"Non-Final Office Action", U.S. Appl. No. 12/709,245, (Mar. 21, 2012), 14 pages.

"Non-Final Office Action", U.S. Appl. No. 12/709,282, (Apr. 12, 2012),9 pages.

"Non-Final Office Action", U.S. Appl. No. 12/713,053, (Feb. 3, 2012),8 pages.

"Non-Final Office Action", U.S. Appl. No. 12/713,096, (Jun. 6, 2012),9 pages.

"Non-Final Office Action", U.S. Appl. No. 12/713,110, (Jun. 21, 2012),21 pages.

"Non-Final Office Action", U.S. Appl. No. 12/713,118, (Jun. 8, 2012),7 pages.

"Non-Final Office Action", U.S. Appl. No. 12/713,133, (Jan. 31, 2012),7 pages.

"Notice of Allowance", U.S. Appl. No. 12/695,064, (Mar. 28, 2012), 12 pages.

"Notice of Allowance", U.S. Appl. No. 12/695,959, (Apr. 17, 2012), 13 pages.

"PCT Search Report and Written Opinion", Application No. PCT/US2011/025132, (Oct. 26, 2011), 10 pages.

"PCT Search Report and Written Opinion", Application No. PCT/US2011/025575, (Sep. 30, 2011), 14 pages.

"PCT Search Report and Written Opinion", Application No. PCT/US2011/025971, (Oct. 31, 2011), 15 pages.

"PCT Search Report and Written Opinion", Application No. PCT/US/2011025972, (Sep. 30, 2011), 14 pages.

"PCT Search Report and Written Opinion", Application No. PCT/US2011/020412, (Aug. 31, 2011),9 pages.

"PCT Search Report and Written Opinion", Application No. PCT/US2011/020410, (Sep. 27, 2011),9 pages.

"PCT Search Report and Written Opinion", Application No. PCT/US2011/020417, (Oct. 20, 2011),8 pages.

"Final Office Action", U.S. Appl. No. 12/700,460, (Aug. 28, 2012),26 pages.

"Final Office Action", U.S. Appl. No. 12/713,053, (Aug. 17, 2012), 10 pages.

"Foreign Office Action", Chinese Application No. 201110046519.X, (Aug. 2, 2012), 12 pages.

"Foreign Office Action", Chinese Application No. 201110046529.3, (Aug. 16, 2012), 13 pages.

"Foreign Office Action", Chinese Application No. 201110050499.3, (Aug. 3, 2012),8 pages.

"Foreign Office Action", Chinese Application No. 201110050508.9, (Aug. 3, 2012),8 pages.

"Non-Final Office Action", U.S. Appl. No. 12/709,301, (Sep. 13, 2012), 13 pages.

"Non-Final Office Action", U.S. Appl. No. 12/695,976, (Sep. 11, 2012),8 pages.

"Non-Final Office Action", U.S. Appl. No. 12/709,348, (Aug. 2, 2012), 14 pages.

"Final Office Action", U.S. Appl. No. 12/695,976, (Nov. 21, 2012), 10 pages.

"Final Office Action", U.S. Appl. No. 12/700,357, (Oct. 24, 2012), 13 pages.

"Final Office Action", U.S. Appl. No. 12/700,510, (Oct. 10, 2012), 23 pages.

"Final Office Action", U.S. Appl. No. 12/709,204, (Oct. 3, 2012), 24 pages.

"Final Office Action", U.S. Appl. No. 12/713,118, (Oct. 26, 2012), 10 pages.

"Foreign Office Action", Chinese Application No. 201110050499.3, (Nov. 27, 2012), 8 pages.

"Non-Final Office Action", U.S. Appl. No. 12/695,842, (Oct. 3, 2012), 16 pages.

"Non-Final Office Action", U.S. Appl. No. 12/713,053, (Nov. 23, 2012), 13 pages.

(56) References Cited

OTHER PUBLICATIONS

"Non-Final Office Action", U.S. Appl. No. 12/713,081, (Nov. 29, 2012), 9 pages.
"Supplementary European Search Report", European Patent Application No. 11747907.1, (Nov. 7, 2012), 3 pages.
"Supplementary European Search Report", European Patent Application No. 11748028.5, (Nov. 7, 2012), 3 pages.
"Supplementary European Search Report", European Patent Application No. 11748027.7, (Nov. 29, 2012), 3 pages.
"Final Office Action", U.S. Appl. No. 12/709,245, (Mar. 15, 2013), 16 pages.
"Final Office Action", U.S. Appl. No. 12/709,282, (Dec. 24, 2012), 11 pages.
"Final Office Action", U.S. Appl. No. 12/709,301, (Jan. 7, 2013), 14 pages.
"Final Office Action", U.S. Appl. No. 12/709,348, (Jan. 7, 2013), 15 pages.
"Final Office Action", U.S. Appl. No. 12/713,096, (Feb. 15, 2013), 7 pages.
"Final Office Action", U.S. Appl. No. 12/713,110, (Jan. 17, 2013), 10 pages.
"Foreign Office Action", Chinese Application No. 201110046529.3, (Feb. 4, 2013), 8 pages.
"Foreign Office Action", European Patent Application No. 11747907.1, (Jan. 28, 2013), 5 pages.
"Foreign Office Action", European Patent Application No. 11748027.7, (Jan. 18, 2013), 5 pages.
"Foreign Office Action", European Patent Application No. 11748026.9, (Jan. 16, 2013), 5 pages.
"Foreign Office Action", European Patent Application No. 11748029.3, (Jan. 16, 2013), 5 pages.
"Foreign Office Action", European Patent Application No. 11748028.5, (Jan. 28, 2013), 5 pages.
"Non-Final Office Action", U.S. Appl. No. 12/709,282, (Feb. 28, 2013), 11 pages.
"Non-Final Office Action", U.S. Appl. No. 12/713,130, (Jan. 16, 2013), 5 pages.
"Non-Final Office Action", U.S. Appl. No. 12/713,133, (Jan. 14, 2013), 8 pages.
"Non-Final Office Action", U.S. Appl. No. 13/484,075, (Jan. 15, 2013), 9 pages.
"Notice of Allowance", U.S. Appl. No. 12/713,130, (Feb. 19, 2013), 5 pages.
"Final Office Action", U.S. Appl. No. 12/472,699, (Jul. 29, 2013), 12 pages.
"Final Office Action", U.S. Appl. No. 12/472,699, (Feb. 15, 2012), 12 pages.
"Final Office Action", U.S. Appl. No. 12/709,282, (Jul. 16, 2013), 11 pages.
"Final Office Action", U.S. Appl. No. 12/713,133, (May 20, 2013), 10 pages.
"Final Office Action", U.S. Appl. No. 13/484,075, (May 21, 2013), 10 pages.
"Foreign Office Action", Chinese Application 201110044285.5, (Apr. 24, 2013), 8 pages.
"Foreign Office Action", Chinese Application 201110044285.5, (Jun. 20, 2012), 12 pages.
"Foreign Office Action", Chinese Application No. 201110044285.5, (Jan. 4, 2013), 13 pages.
"Foreign Office Action", Chinese Application No. 201110046510.9, (May 31, 2013), 11 pages.
"Foreign Office Action", Chinese Application No. 201110046519.X, (Mar. 19, 2013), 12 pages.
"Foreign Office Action", Chinese Application No. 201110050506.X, (Apr. 2, 2013), 11 pages.
"Foreign Office Action", Chinese Application No. 201110050508.9, (Mar. 7, 2013), 8 pages.
"Foreign Office Action", Chinese Application No. 201110050852.8, (Mar. 26, 2013), 10 pages.

"Non-Final Office Action", U.S. Appl. No. 12/472,699, (Mar. 28, 2013), 10 pages.
"Non-Final Office Action", U.S. Appl. No. 12/472,699, (Sep. 12, 2011), 12 pages.
"Non-Final Office Action", U.S. Appl. No. 12/695,842, (May 22, 2013), 16 pages.
"Non-Final Office Action", U.S. Appl. No. 12/709,204, (Jun. 6, 2013), 27 pages.
"Non-Final Office Action", U.S. Appl. No. 12/709,245, (May 30, 2013), 15 pages.
"Non-Final Office Action", U.S. Appl. No. 12/709,301, (May 14, 2013), 14 pages.
"Non-Final Office Action", U.S. Appl. No. 12/709,348, (Apr. 25, 2013), 15 pages.
"Non-Final Office Action", U.S. Appl. No. 12/713,096, (Jun. 26, 2013), 8 pages.
"Non-Final Office Action", U.S. Appl. No. 12/713,110, (May 3, 2013), 10 pages.
"Non-Final Office Action", U.S. Appl. No. 12/713,113, (Apr. 23, 2013), 18 pages.
"Notice of Allowance", U.S. Appl. No. 12/713,053, (Jun. 7, 2013), 7 pages.
"UI Guidelines", Retrieved from: http://na.blackberry.com/eng/deliverables/6622/BlackBerry_Smartphones-US.pdf., 76 Pages.
Nordgren, Peder "Development of a Touch Screen Interface for Scania Interactor", *Master's Thesis in Computing Science, UMEA University*, Available at <http://www.cs.umu.se/education/examina/Rapporter/PederNordgren.pdf>,(Apr. 10, 2007), pp. 1-59.
Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.
"Final Office Action", U.S. Appl. No. 12/709,204, (Sep. 12, 2013), 24 pages.
"Final Office Action", U.S. Appl. No. 12/709,301, (Sep. 3, 2013), 12 pages.
"Final Office Action", U.S. Appl. No. 12/709,348, (Sep. 12, 2013), 12 pages.
"Final Office Action", U.S. Appl. No. 12/713,113, (Oct. 8, 2013), 21 pages.
"Foreign Office Action", Chinese Application No. 201110050852.8, (Nov. 1, 2013), 8 Pages.
"Foreign Office Action", Chinese Application No. 201110046519.X, (Aug. 6, 2013), 11 pages.
"Foreign Office Action", Chinese Application No. 201110046529.3, (Aug. 6, 2013), 11 pages.
"Non-Final Office Action", U.S. Appl. No. 12/472,699, (Oct. 23, 2013), 14 pages.
"Non-Final Office Action", U.S. Appl. No. 12/709,282, (Oct. 10, 2013), 12 pages.
"Non-Final Office Action", U.S. Appl. No. 12/709,301, (Oct. 24, 2013), 11 pages.
"Notice of Allowance", U.S. Appl. No. 12/713,110, Dec. 4, 2013, 13 pages.
"Final Office Action", U.S. Appl. No. 12/695,842, Dec. 2, 2013, 17 pages.
"Supplemental Notice of Allowance", U.S. Appl. No. 12/713,133, Feb. 3, 2014, 2 pages.
"Non-Final Office Action", U.S. Appl. No. 12/713,127, Jan. 31, 2014, 21 pages.
"Ex Parte Mewherter, PTAB precedential decision", U.S. Appl. No. 10/685,192, May 8, 2013, 22 pages.
"Non-Final Office Action", U.S. Appl. No. 12/713,096, Jan. 30, 2014, 23 pages.
"Non-Final Office Action", U.S. Appl. No. 12/709,204, Nov. 20, 2013, 31 pages.
"Notice of Allowance", U.S. Appl. No. 12/713,133, Jan. 17, 2014, 4 pages.
"Foreign Office Action", CN Application No. 201110046510.9, Feb. 12, 2014, 8 Pages.
"Non-Final Office Action", U.S. Appl. No. 12/713,133, Dec. 10, 2013, 8 pages.

(56) References Cited

OTHER PUBLICATIONS

"Non-Final Office Action", U.S. Appl. No. 12/709,348, Dec. 20, 2013, 9 pages.

"Non-Final Office Action", U.S. Appl. No. 12/713,113, Jun. 4, 2014, 11 pages.

"Non-Final Office Action", U.S. Appl. No. 12/709,301, May 23, 2014, 12 pages.

"Non-Final Office Action", U.S. Appl. No. 12/700,510, Jun. 12, 2014, 26 pages.

"Non-Final Office Action", U.S. Appl. No. 12/695,937, May 7, 2014, 11 pages.

"Non-Final Office Action", U.S. Appl. No. 12/709,245, Mar. 20, 2014, 16 pages.

"Final Office Action", U.S. Appl. No. 12/709,282, May 9, 2014, 17 pages.

"Final Office Action", U.S. Appl. No. 12/709,204, Apr. 11, 2014, 24 pages.

"Notice of Allowance", U.S. Appl. No. 12/472,699, May 2, 2014, 6 pages.

"Foreign Office Action", CN Application No. 201110050506.X, Feb. 26, 2014, 6 pages.

Roudaut, et al.,' "Leaf Menus: Linear Menus with Stroke Shortcuts for Small Handheld Devices", Proceedings of the 12th IFIP TC 13 International Conference on Human-Computer Interaction: Part I, Aug. 2009, 4 pages.

\* cited by examiner

PAGE MANIPULATIONS USING ON AND OFF-SCREEN GESTURES

BACKGROUND

One of the challenges that continues to face designers of devices having user-engageable displays, such as touch displays, pertains to providing enhanced functionality for users, without necessarily permanently manifesting the functionality as part of the "chrome" of a device's user interface. This is so, not only with devices having larger or multiple screens, but also in the context of devices having a smaller footprint, such as tablet PCs, hand-held devices, smaller multi-screen devices and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Bezel gestures for touch displays are described. In at least some embodiments, the bezel of a device is used to extend functionality that is accessible through the use of so-called bezel gestures. In at least some embodiments, off-screen motion can be used, by virtue of the bezel, to create screen input through a bezel gesture. Bezel gestures can include single-finger bezel gestures, multiple-finger/same-hand bezel gestures, and/or multiple-finger, different-hand bezel gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Bezel gestures for touch displays are described. In at least some embodiments, the bezel of a device is used to extend functionality that is accessible through the use of so-called bezel gestures. In at least some embodiments, off-screen motion can be used, by virtue of the bezel, to create screen input through a bezel gesture. Bezel gestures can include single-finger bezel gestures, multiple-finger/same-hand bezel gestures, and/or multiple-finger, different-hand bezel gestures.

In the following discussion, a variety of different implementations are described that involve bezel gestures, or gestures associated with bezel gestures, to initiate and/or implement functions on a computing device. In this way, a user may readily access enhanced functions of a computing device in an efficient and intuitive manner.

In the following discussion, an example environment is first described that is operable to employ the gesture techniques described herein. Example illustrations of the gestures and procedures are then described, which may be employed in the example environment, as well as in other environments. Accordingly, the example environment is not limited to performing the example gestures and the gestures are not limited to implementation in the example environment.

Example Environment

Figure 1:
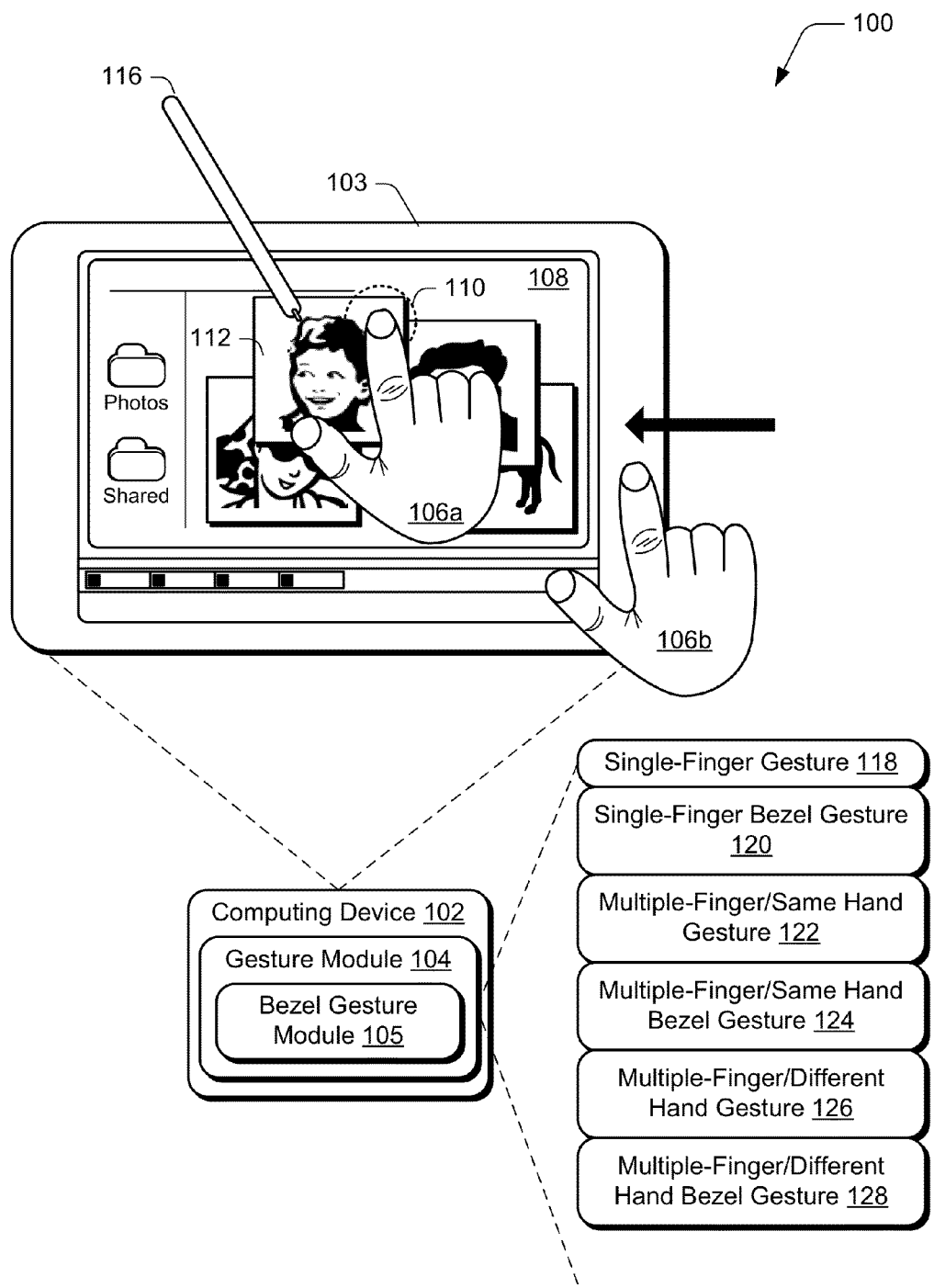
FIG. 1 is an illustration of an environment in an example implementation in accordance with one or more embodiments.

FIG. 1 is an illustration of an environment 100 in an example implementation that is operable to employ bezel gestures and other techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a bezel 103 that forms part of the device's housing. The bezel is made up of the frame structure adjacent the device's display, also referred to as display device 108 below. Computing device 102 includes a gesture module 104 and a bezel gesture module 105 that forms part of the gesture module 104. The gesture modules can be implemented in connection with any suitable type of hardware, software, firmware or combination thereof. In at least some embodiments, the gesture modules are implemented in software that resides on some type of tangible, computer-readable medium examples of which are provided below.

Gesture module 104 and bezel gesture module 105 are representative of functionality that recognizes gestures and bezel gestures, respectively, and causes operations to be performed that correspond to the gestures. The gestures may be recognized by modules 104, 105 in a variety of different ways. For example, the gesture module 104 may be configured to recognize a touch input, such as a finger of a user's hand 106a as proximal to display device 108 of the computing device 102 using touchscreen functionality. In addition, bezel gesture module 105 can be configured to recognize a touch input, such as a finger of a user's hand 106b, that initiates a gesture on or adjacent bezel 103 and proceeds onto display device 108. Any suitable technology can be utilized to sense an input on or adjacent bezel 103. For example, in at least some embodiments, the digitizer or sensing elements associated with display device 108 can extend underneath bezel 103. In this instance, technologies such as capacitive field technologies, as well as others, can be utilized to sense the user's input on or adjacent to the bezel 103.

Alternately or additionally, in embodiments in which display device 108 does not extend underneath bezel 103, but rather lies flush with the bezel, bezel gesture module 105 can detect the changing contact profile of the user's finger as it emerges onto display device 108 from bezel 103. Alternately or additionally, approaches that utilize the centroid of the user's touch profile can be utilized to detect a changing centroid contact profile that is suggestive of a bezel gesture. Further, techniques for fingerprint sensing can be employed. Specifically, if the sensing substrate is sensitive enough to determine ridges of the finger or fingers contacting the display, then the orientation of the finger(s) as well as the fact that the fingerprint is clipped by the bezel can be detected. Needless to say, any number of different techniques can be utilized to sense a user's input relative to the bezel 103. The touch input may also be recognized as including attributes (e.g., movement, selection point, etc.) that are usable to differentiate the touch input from other touch inputs recognized by the gesture modules 104, 105. This differentiation may then serve as a basis to identify a gesture from the touch inputs and consequently an operation that is to be performed based on identification of the gesture. This yields the general benefit that gestures that start from the bezel and enter onto the screen are, in general, distinguishable from other ostensibly similar gestures that access on-screen content, since there is no reason for users to position their fingers starting partially or fully off-screen if their intent is to interact with something on the screen. Hence, normal direct manipulative gestures, even for objects near the screen boundaries, are still possible and do not interfere with bezel gestures and vice versa.

For example, a finger of the user's hand 106a is illustrated as selecting 110 an image 112 displayed by the display device 108. Selection 110 of the image 112 and subsequent movement of the finger of the user's hand 106a may be recognized by the gesture module 104. The gesture module 104 may then identify this recognized movement as indicating a "drag and drop" operation to change a location of the image 112 to a point in the display at which the finger of the user's hand 106a was lifted away from the display device 108. Thus, recognition of the touch input that describes selection of the image, movement of the selection point to another location, and then lifting of the finger of the user's hand 106a may be used to identify a gesture (e.g., drag-and-drop gesture) that is to initiate the drag-and-drop operation.

A variety of different types of gestures may be recognized by the gesture modules 104, 105 such as gestures that are recognized from a single type of input (e.g., touch gestures such as the previously described drag-and-drop gesture) as well as gestures involving multiple types of inputs. For example, modules 104, 105 can be utilized to recognize single-finger gestures and bezel gestures, multiple-finger/same-hand gestures and bezel gestures, and/or multiple-finger/different-hand gestures and bezel gestures.

For example, the computing device 102 may be configured to detect and differentiate between a touch input (e.g., provided by one or more fingers of the user's hand 106a, 106b) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Thus, the gesture modules 104, 105 may support a variety of different gesture techniques through recognition and leverage of a division between stylus and touch inputs, as well as different types of touch inputs.

Accordingly, the gesture modules 104, 105 may support a variety of different gestures. Examples of gestures described herein include a single-finger gesture 118, a single-finger bezel gesture 120, a multiple-finger/same-hand gesture 122, a multiple-finger/same-hand bezel gesture 124, a multiple-finger/different hand gesture 126, and a multiple-finger/different-hand bezel gesture 128. Each of these different types of bezel gestures is described below.

Figure 2:
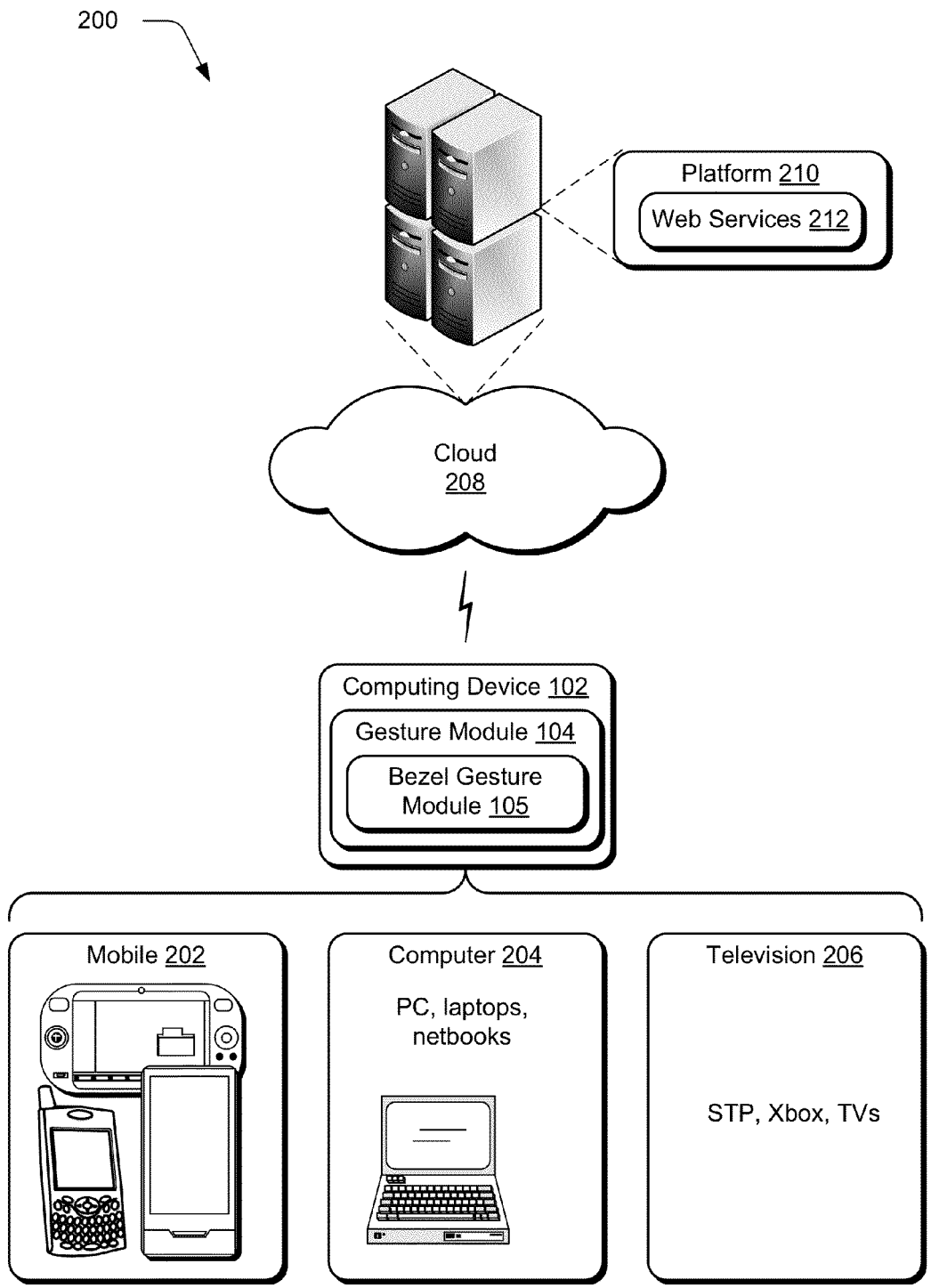
FIG. 2 is an illustration of a system in an example implementation showing FIG. 1 in greater detail.

FIG. 2 illustrates an example system showing the gesture module 104 and bezel gesture module 105 of FIG. 1 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein are may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, the gesture modules 104, 105 may be implemented in part on the computing device 102 as well as via a platform 210 that supports web services 212.

For example, the gesture techniques supported by the gesture modules may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example bezel gestures and gestures associated with bezel gestures. A first section entitled "Use of Bezel as an Input Mechanism" describes embodiments in which a computing device's bezel can be used as an input mechanism. Following this, a section entitled "Using Off-Screen Motion to Create On-Screen Input" describes how a motion away from a device's screen can be utilized, through gestures, to create on-screen input. Next, a section entitled "Use of Multiple Fingers for Gesturing" describes how multiple fingers can be utilized to provide gestural input. Following this section, a section entitled "Radial Menus" describes embodiments in which radial menus can be utilized to provide a robust collection of input options. Next, a section entitled "On and Off Screen Gestures and Combinations—Page/Object Manipulation" describes various types of gestures and combinations that can be utilized to manipulate pages and/or objects. Last, a section entitled "Example Device" describes aspects of an example device that can be utilized to implement one or more embodiments.

Use of Bezel as an Input Mechanism

In one or more embodiments, the bezel of a device can be utilized as an input mechanism. For example, in instances in which the display device extends under the bezel, a user's finger or other input mechanism can be sensed when it hovers over or physically engages the bezel. Alternately or additionally, the bezel can include sensing mechanisms, such as infrared mechanisms as well as others, that sense a user's finger or other input mechanism hovering over or physically engaging the bezel. Any combination of inputs relative to the bezel can be used. For example, to provide various inputs to the device, the bezel can be tapped one or more times, held, slid over, hovered over and/or any combination of these or other inputs.

Figure 3:
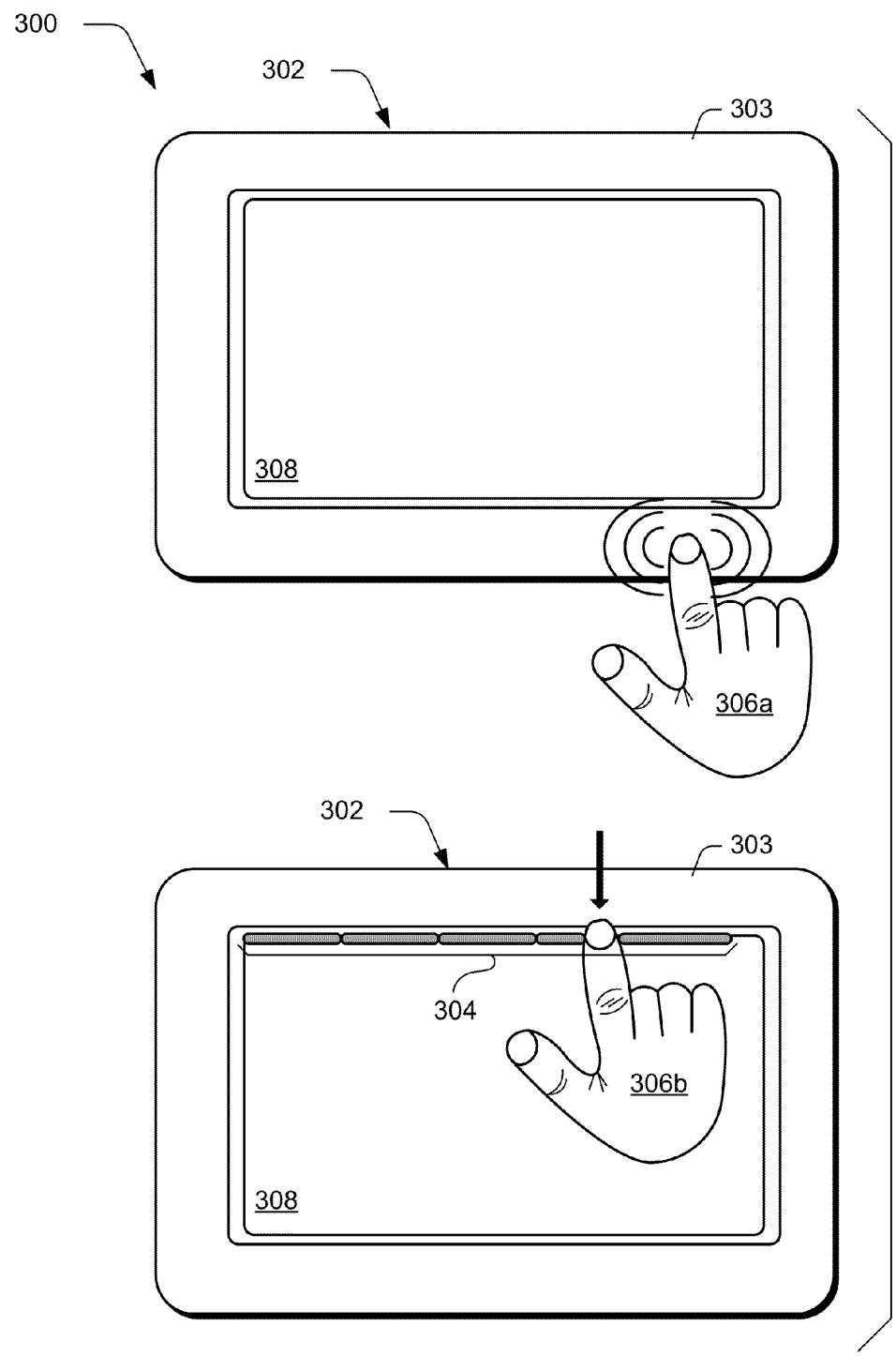
FIG. 3 illustrates an example computing device in accordance with one or more embodiments.

As an example, consider the following. Many selection, manipulation, and context menu activation schemes utilize a distinction between a device's background canvas and objects that appear on the canvas. Using the bezel as an input mechanism can provide a way to access a page in the background canvas, even if the page itself is covered by many closely-spaced objects. For example, tapping on the bezel may provide a mechanism to deselect all objects. Holding on the bezel could be used to trigger a context menu on the page. As an example, consider FIG. 3 which illustrates an example environment 300 that includes a computing device 302 having a bezel 303 and a display device 308. In this instance, a finger on user's hand 306a is tapping on bezel 303. By tapping on the bezel, the user's input is sensed and an associated functionality that is mapped to the input can be provided. In the above example, such functionality might deselect all objects appearing on display device 308. In addition, input can be received at different locations on the bezel and can be mapped to different functionality. For example, input received on the right side of the bezel might be mapped to a first functionality; input received on the left side of the bezel might be mapped to a second functionality and so on. Furthermore, input received in different regions of a bezel side might be mapped to different functionality or to no functionality at all depending on the orientation of the device and how the user is holding it. Some bezel edges may be left unassigned or may be insensitive to touch-and-hold, so that inadvertent operations will not be triggered. Thus, any one particular side of the bezel might be utilized to receive input and, accordingly map that input to different functionality depending on what region of the bezel receives the input. It is to be appreciated and understood that input received via the bezel can be received independent of any input received via hardware input devices, such as buttons, track balls, and other instrumentalities that might be located on an associated device. Further, in at least some embodiments, input received via the bezel can be the only user input that is utilized to ascertain and access a particular functionality. For example, input received solely on the bezel can provide the basis by which device functionality can be accessed. Further, in some embodiments, orientation sensors (e.g. accelerometers) may be used as an input to help decide which bezel edges are active. In some embodiments quick, intentional tap remains available, but only touch and hold is ignored to differentiate from simply holding the device with a finger that happens to be resting on the bezel.

Alternately or additionally, in at least some embodiments, a visual affordance can be utilized to provide a hint or indication of accessible functionality associated with the bezel. Specifically, a visual affordance can be utilized to indicate functionality that is accessible by virtue of a bezel gesture. Any suitable type of visual affordance can be utilized. As an example, consider again FIG. 3. There, a visual affordance in the form of a semi-transparent strip 304 provides an indication that additional functionality can be accessed through utilization of a bezel gesture. The visual affordance can take any suitable form and can be located at any suitable location on display device 308. Furthermore, the visual affordance can be exposed in any suitable way. For example, in at least some embodiments, input received via the bezel can be used to expose or display the visual affordance. Specifically, in at least some embodiments, a "peek out" visual affordance can be presented responsive to detecting a hover over, or a physical engagement of the device's bezel. The "peek out" visual affordance can, in at least some embodiments, be deselected by the user such that the "peek out" is hidden.

In this particular example, the additional functionality associated with semi-transparent strip 304 resides in the form of a so-called bezel menu which is accessible using a bezel gesture. Specifically, in one or more embodiments, the bezel menu can be accessed through a gesture in which a finger of user's hand 306*b* touches the bezel and then moves across the bezel and onto the display device 308 in the direction of the illustrated arrow. This can allow the bezel menu to be dropped down as will be described in more detail below.

Accordingly, various embodiments can use the bezel itself as an input mechanism, as in the first example above. Alternately or additionally, various other embodiments can use the bezel in connection with a visual affordance that provides a clue to the user that additional functionality can be accessed by virtue of a bezel gesture.

Figure 4:
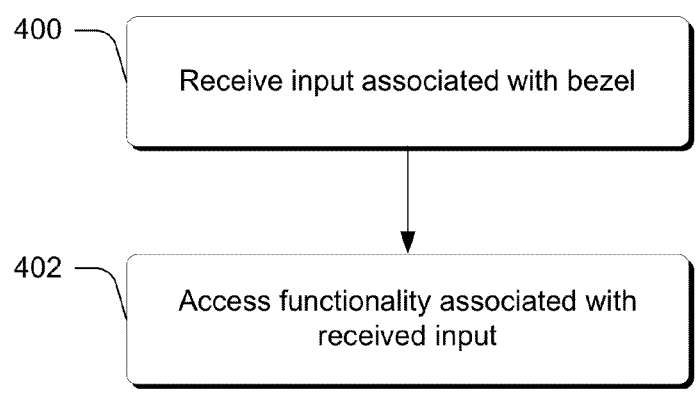
FIG. 4 is a flow diagram that describes the steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 400 receives an input associated with a bezel. Any suitable type of input can be received, examples of which are provided above. Step 402 accesses functionality associated with the received input. Any suitable type of functionality can be accessed. By virtue of providing a variety of different types of recognizable inputs (e.g., taps, tap combinations, tap/hold combinations, slides, etc), and mapping those recognizable inputs to different types of functionalities, a robust collection of user input mechanisms can be provided.

Figure 5:
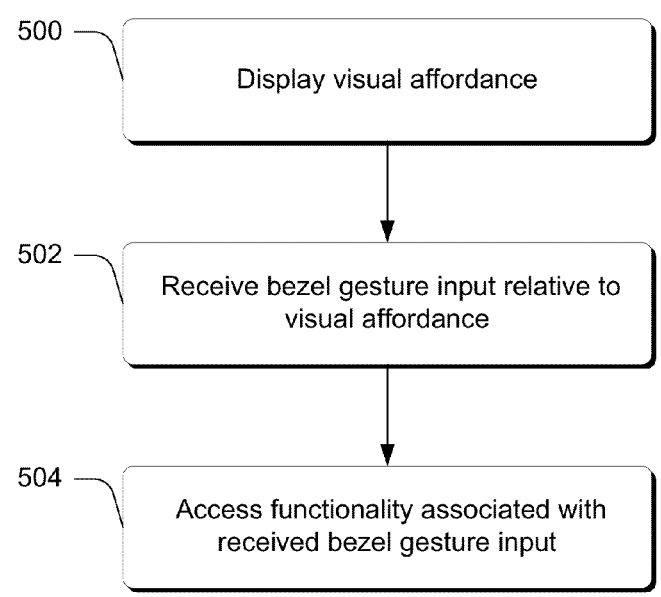
FIG. 5 is a flow diagram that describes the steps in a method in accordance with one or more embodiments.

FIG. 5 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 500 displays a visual affordance on a display device associated with a computing device. Any suitable type of visual affordance can be utilized, an example of which is provided above. Step 502 receives a bezel gesture input relative to the visual affordance. Any suitable type of bezel gesture input can be utilized. Step 504 accesses functionality associated with the received bezel gesture input. Any suitable type of functionality can be accessed, an example of which is provided above and described in more detail below.

Having considered examples in which the bezel can be used as an input mechanism, consider now various embodiments that can utilize off-screen or off-display motion to create screen or display input.

Using Off-Screen Motion to Create on-Screen Input

In at least some embodiments, off-screen to on-screen motion (or vice versa) can be utilized as a mechanism to expose a menu or to access some other type of functionality. The off-screen motion or input can be provided, as indicated above, relative to the device's bezel. Any suitable type of bezel gesture input can be provided in order to effectuate the off-screen to on-screen motion. For example, bezel gestures or inputs can, by way of example and not limitation, start or end on the bezel, cross or recross the bezel, cross at different locations of the bezel (e.g., the corners, or particular ranges of coordinates along a particular edge), and/or occur on one or more bezels associated with multiple screens (with the possibility of different semantics depending on the screen or edge thereof). Further, bezel inputs can include, by way of example and not limitation, a single-contact drag (finger or pen), two-contact drag (two fingers), and/or a hand-contact drag (multiple fingers/whole hand/multiple or single fingers on different hands). For example, pinch gestures from off-screen space (i.e. originating on the bezel) can be utilized and mapped to different functionalities. For example, bezel gestures with multiple contacts entering from different edges of the screen can have different semantics. Specifically, two fingers entering from adjacent edges of the bezel (i.e. spanning a corner) might be mapped to a zoom out operation that zooms out on a page to show an extended workspace or canvas. Two fingers entering from opposite edges, with either one hand (if the screen is small enough), or two hands (one finger from each hand) can be mapped to a different functionality. Multiple fingers entering on one edge of the bezel and one finger entering from an adjacent or opposite edge of the bezel might be mapped to a different functionality. Additionally, multiple fingers entering from two or more edges can further be mapped to additional functionality.

Figure 6:
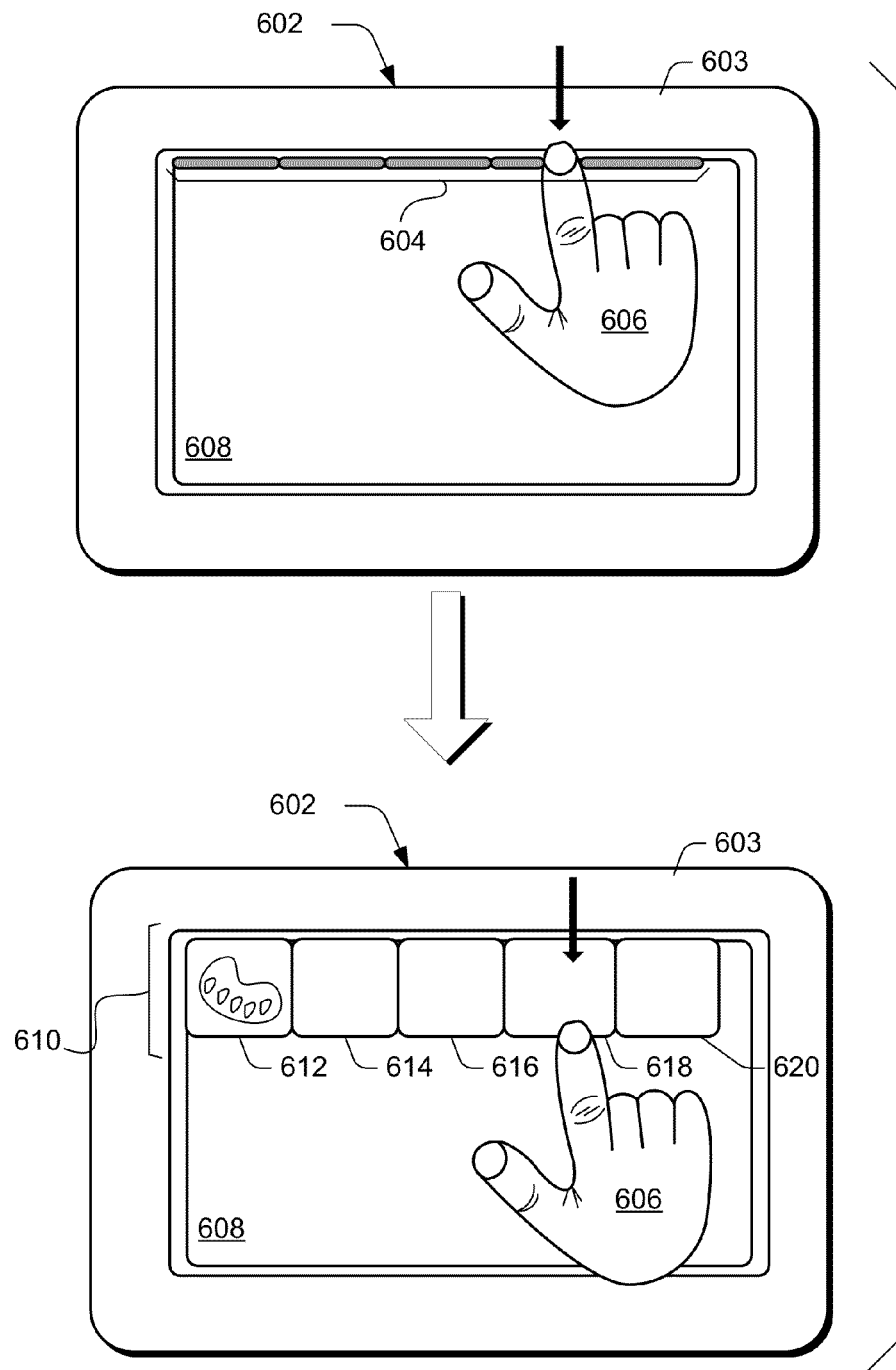
FIG. 6 illustrates an example computing device in accordance with one or more embodiments.

As another example, consider FIG. 6. There, device 602 includes a bezel 603 and a visual affordance 604 that is rendered on display device 608. As noted above, visual affordance 604, in the form of a semi-transparent strip, can be utilized to provide a hint or indication of accessible functionality, in this case a bezel menu, associated with the bezel.

In one or more embodiments, the bezel menu can be accessed through a bezel gesture in which a finger of user's hand 606 touches the bezel and then moves across the bezel and onto the display device 608 in the direction of the illustrated arrow. This can allow bezel menu 610 to be dropped down at which time it can become fully opaque.

In the illustrated and described embodiment, bezel menu 610 includes multiple selectable icons or slots 612, 614, 616, 618, and 620. Each of the icons or slots is associated with a different functionality such as, for example, paint functionality, pen functionality, note functionality, object creation, object editing, and the like. It is to be appreciated and understood, that any type of functionality can be associated with the icons or slots.

In the illustrated and described environment, bezel menu 610 can enable a user to access and activate commands, tools, and objects. The bezel menu can be configured to respond to both touch input and pen input. Alternately or additionally, the bezel menu can be configured to respond only to touch input.

In at least some embodiments, different gestural modes can be utilized to access functionality associated with the bezel menu 610. For example, one gestural mode can be a novice mode, and another gestural mode can be an expert mode.

In the novice mode, after the user gestures to reveal the bezel menu 610, the user can lift their finger, whereupon the bezel menu can remain open for a configurable interval (or indefinitely). The user may then tap on a desired item associated with one of the icons or slots 612, 614, 616, 618, and 620. Through this gesture, the functionality associated with a particular icon or slot can be accessed. For example, tapping on a particular icon or slot may cause an object to be created on the canvas associated with display device 608. In at least some embodiments, in the novice mode, objects that are accessed from the bezel menu appear in default locations on the canvas. The user may close the bezel menu by sliding it back off of the screen (an on-screen-to-offscreen gesture) or by tapping outside of the bezel menu, without activating any function.

In the expert mode, once the user is familiar with the location of commonly used items accessible from the bezel menu, the user can perform a continuous finger-drag that crosses through the slot or icon and onto the canvas to create and drag an associated object (or tool, or interface mode) to a specific desired position or path, in a single transaction. The user can then let go of the object and interact with it. As an example, consider FIG. 7. There, the user has performed a bezel gesture that has dragged across icon or slot 614 to access functionality associated with a post-it note and has positioned the corresponding note on the canvas as indicated. At this point, the user can lift a finger and annotate the digital post-it as desired using an associated pen. In at least some embodiments, the bezel menu 610 may or may not remain fully open after a particular functionality has been accessed.

Figure 7:
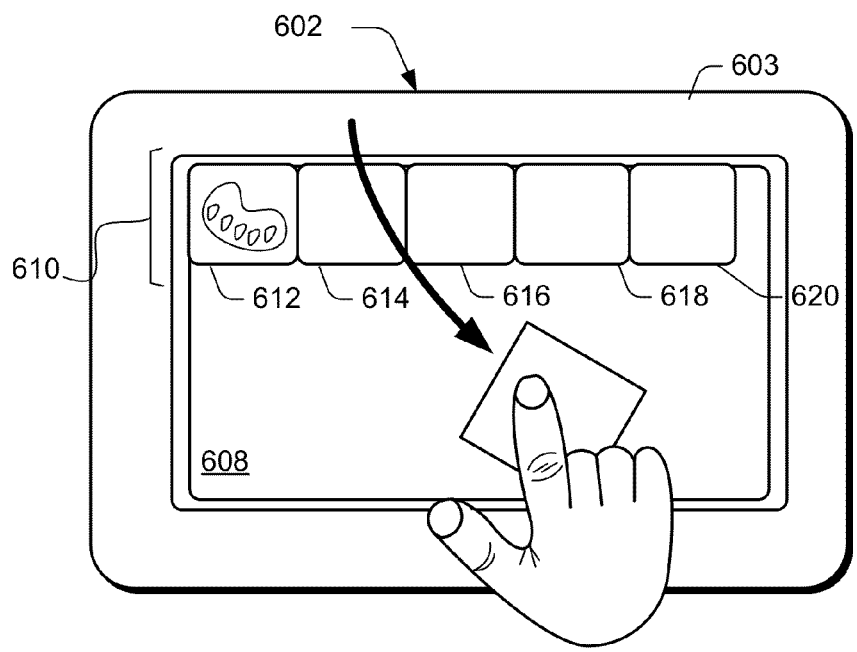
FIG. 7 illustrates an example computing device in accordance with one or more embodiments.
Figure 8:
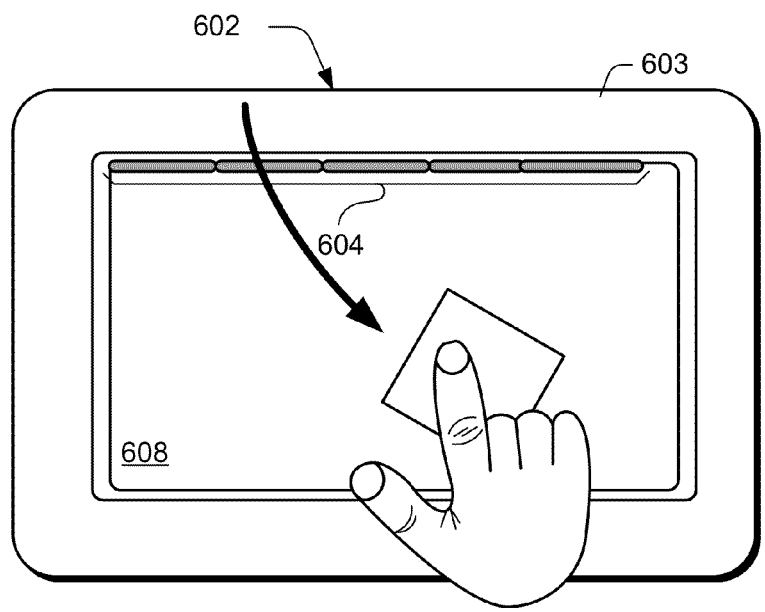
FIG. 8 illustrates an example computing device in accordance with one or more embodiments.

In at least some other embodiments, in the expert mode, the bezel menu may not necessarily be revealed at all in order to access functionality associated with an icon or slot. Rather, a bezel gesture that crosses the visual affordance at a location that corresponds to a particular icon or slot may access functionality associated with the icon or slot. As an example, consider FIG. 8. There, visual affordance 604 is illustrated. Notice that the bezel gesture crosses over a portion of the visual affordance that corresponds to icon or slot 614 (FIG. 7). Notice also that by virtue of this bezel gesture, a corresponding post-it note has been accessed. This feature can be implemented by using a time delay, e.g. ⅓ second, and considering the location of the user's finger before actually deciding whether to deploy the bezel menu responsive to a bezel gesture. The idea here is that the bezel menu stays hidden unless the user pauses, or just pulls out the menu, without completing a drag-off of the desired item. This is accomplished using a time delay before the bezel menu starts to slide out. Hence, once users are familiar with a particular operation on the bezel menu, they can rapidly drag through it to create and position an object without ever having to be distracted by the opening of the visual menu itself. This can encourage expert performance based on ballistic motion driven by procedural memory, rather than visually guided performance based on direct manipulation of a widget. The concept succeeds because the novice way of using it helps to learn and encourage the expert way of working with it.

As but one example of how this can work in accordance with one embodiment, consider the following. When the finger is observed to cross from the screen bezel into a slot of the bezel menu, a timer is started. No other immediate visual feedback occurs. When the timer expires, if the finger is still in the region occupied by the bezel menu, the bezel menu slides out and tracks with the user's finger. When the user's finger lifts inside the bezel menu area, it stays posted. This is the novice mode described above. The user can lift a finger to inspect all slots, and tap on the desired one to create the desired object (rather than dragging it). The user can also touch down and drag an item onto the canvas from the novice mode. If the finger has slid past a threshold distance or region, then the bezel menu remains closed but the function indicated by the slot that was crossed is activated, e.g. a post-it is created and starts following the user's finger. This is the expert mode described above. An implementation consideration is that the slot that is selected by the expert mode gesture can be determined by the location at which the finger crosses the screen edge.

In at least some embodiments, the bezel menu can be scrollable in order to provide access to the additional functionality. For example, the bezel menu can have left and right arrows on either side to enable scrollability. Alternately or additionally, a single or multi-finger drag that is orthogonal to the opening direction of the bezel menu can scroll it, without the need for any arrows.

Figure 9:
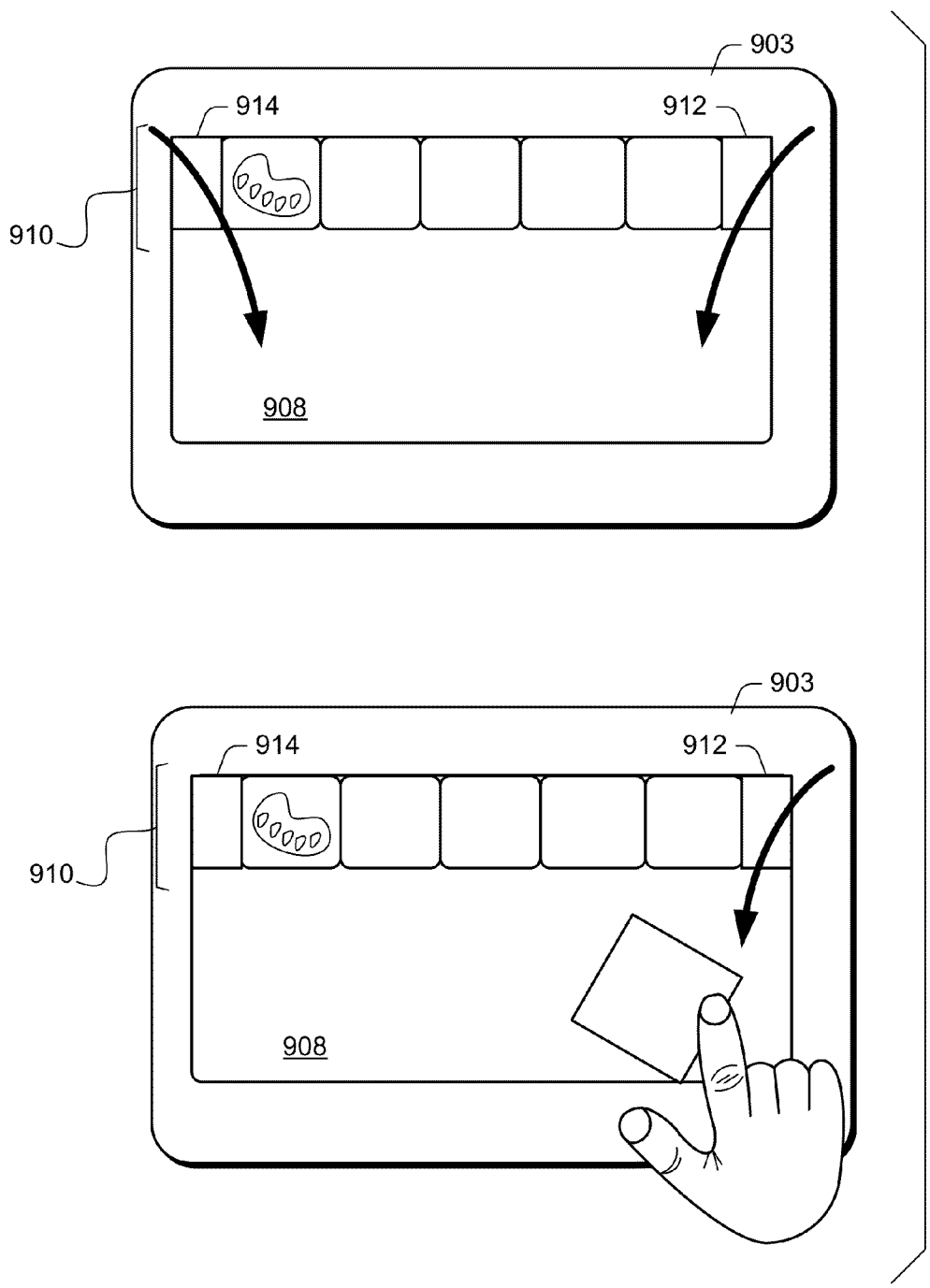
FIG. 9 illustrates an example computing device in accordance with one or more embodiments.

In at least some embodiments, the bezel menu can create space for additional slots or icons. For example, by reducing the width of slots or icons that appear at the edge of the bezel menu, additional slots or icons can be added. As an example, consider FIG. 9.

There, a device includes a bezel 903 and a bezel menu 910 that appears on display device 908. Additional slots or icons 912, 914 appear in the bezel menu 910. Notice that the slots or icons 912, 914 have a reduced width relative to other slots or icons. In this example, the width is reduced by about one half. In order to access objects associated with slots or icons 912, 914, a bezel gesture can be used that drags over the slot or icon from the side of the device as shown. In some embodiments, the corner slots or icons can have a special status. For example, the corner slots or icons may be permanently assigned to a particular functionality and may not be customizable.

Accordingly, bezel menus can be used to expose functionality to a user in a manner that does not permanently cause screen real estate to be occupied or require the use of a dedicated hardware button.

Figure 10:
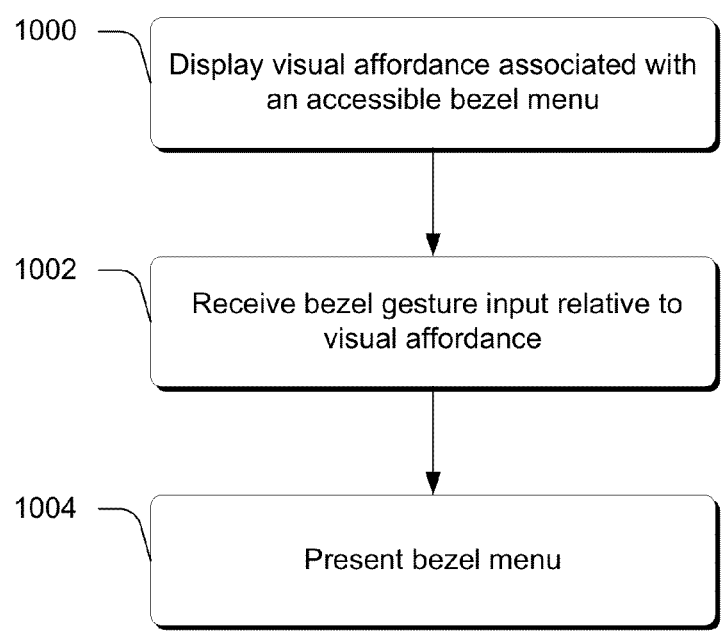
FIG. 10 is a flow diagram that describes the steps in a method in accordance with one or more embodiments.

FIG. 10 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 1000 displays a visual affordance associated with an accessible bezel menu. An example of a suitable visual affordance is given above. Step 1002 receives a bezel gesture input relative to the visual affordance. Any suitable bezel gesture can be utilized, an example of which is provided above. Step 1004 presents, responsive to receiving the bezel gesture input, a bezel menu. Any suitable bezel menu can be utilized. In at least some embodiments, the bezel menu can be presented simply by virtue of receiving a bezel gesture without necessarily displaying a visual affordance. Alternately or additionally, the visual affordance may fade in when the user's finger or pen hovers above an associated bezel edge.

Figure 11:
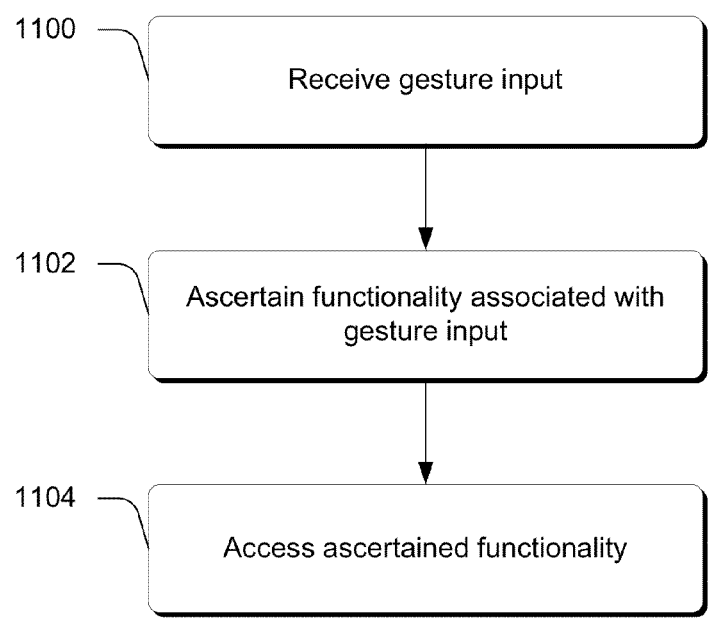
FIG. 11 is a flow diagram that describes the steps in a method in accordance with one or more embodiments.

FIG. 11 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 1100 receives a gesture input. The input can be received relative to a bezel menu or a visual affordance associated with a bezel menu. Any suitable gesture input can be received. For example, the gesture input can comprise an input that does not use or incorporate the bezel. An example of this was provided above in the discussion of FIG. 6 relative to a user tapping on an exposed portion of the bezel menu. Alternately or additionally, the gesture input can comprise a bezel gesture input. An example of this was provided above in the discussion of FIGS. 7-9. Step 1102 ascertains a functionality associated with the gesture input. Step 1104 accesses the functionality that was ascertained in step 1102. Examples of how this can be done are provided above.

The examples above illustrate gestures, including bezel gestures that utilize a single finger. In other embodiments, more than one finger can be utilized in connection with gestures including bezel gestures.

Use of Multiple Fingers for Gesturing

In one or more embodiments, multiple fingers can be utilized for gesturing, including bezel gesturing. The multiple fingers can reside on one hand or, collectively, on both hands. The use of multiple fingers can enable multiple numbers of touches to be mapped to different functionalities or objects associated with functionalities. For example, a two-finger gesture or bezel gesture might be mapped to a first functionality or a first object associated therewith, and a three-finger gesture or bezel gesture might be mapped to a second functionality or a second object associated therewith. As an example, consider FIG. 12.

There, device 1202 includes a bezel 1203 and a visual affordance 1204 that is rendered on the display device. As noted above, visual affordance 1204, in the form of a semi-transparent strip, can be utilized to provide a hint or indication of accessible functionality, in this case a bezel menu 1210, associated with the bezel.

As noted above, the bezel menu 1210 can be accessed through a bezel gesture in which a finger of the user's hand touches the bezel and then moves across the bezel and onto the display device to drag the bezel menu down.

In one or more embodiments, bezel menu 1210 can be exposed and further extended into a drawer illustrated at 1212. In the illustrated and described embodiment, the following bezel gesture can be used to expose drawer 1212. First, a user touches down with one or more fingers on or near the bezel 1203. This is illustrated in the top-most portion of FIG. 12. From there, the user can drag multiple fingers onto the display device as illustrated in the bottom-most portion of FIG. 12, thereby exposing drawer 1212. In at least some embodiments, no objects are created, by default, when multiple fingers simultaneously cross the bezel menu. That is, in these embodiments, a multi-finger gesture as described above indicates that the drawer 1212 is being accessed. Drawer 1212 can have additional objects such as those that are illustrated. Additional objects can include, by way of example and not limitation, additional tools, colors, and various other objects. In addition, in at least some embodiments, drawer 1212 can be utilized to store and/or arrange various items. Items can be arranged or rearranged in any suitable way such as, by direct manipulation by the user, e.g. by dragging and dropping an object within the drawer.

Figure 13:
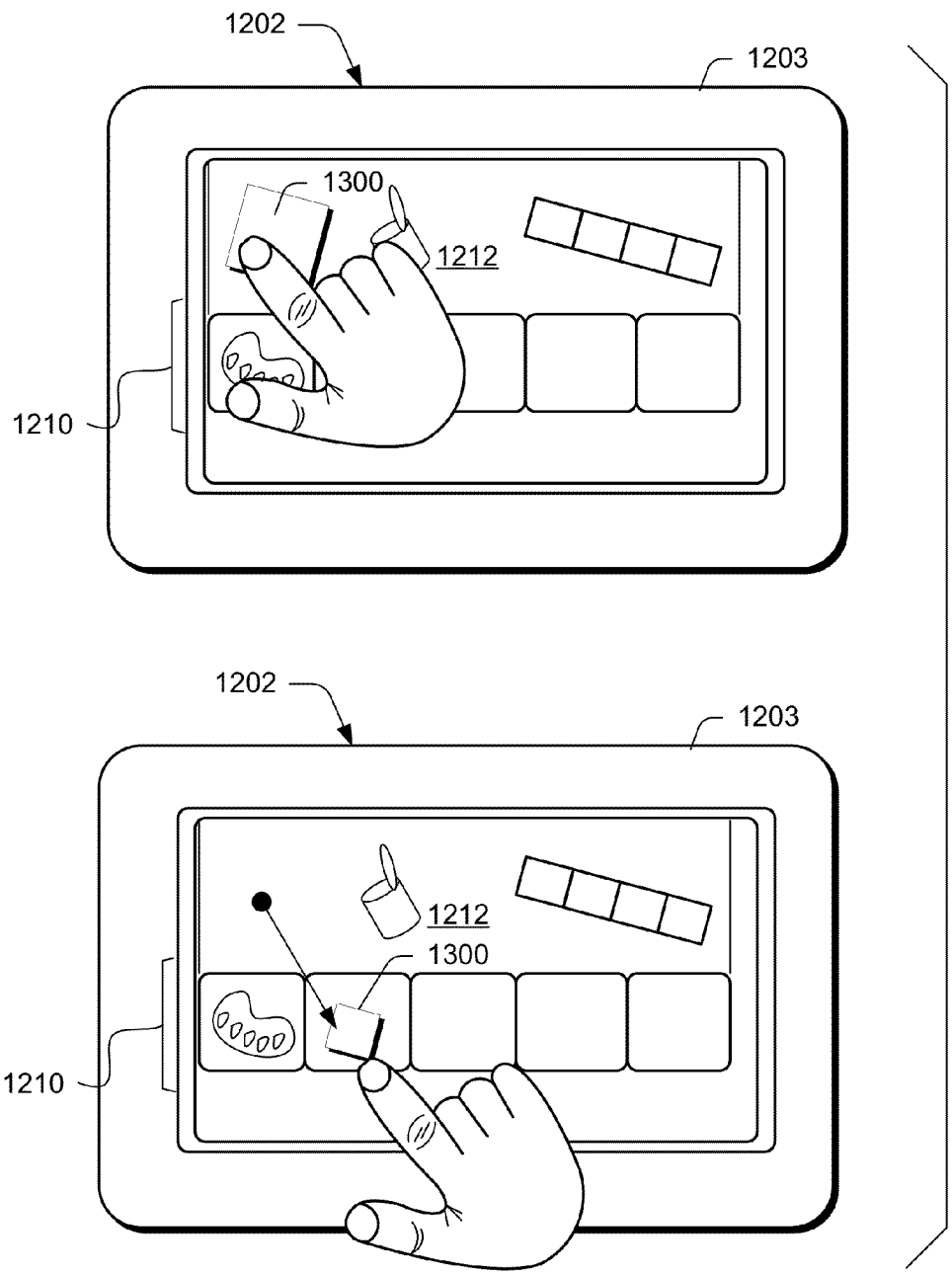
FIG. 13 illustrates an example computing device in accordance with one or more embodiments.

In at least some embodiments, lifting the hand may leave the drawer open until it is later closed by way of a similar gesture in the opposite direction. In at least some embodiments, bezel menu 1210 can be customized using, for example, contents from drawer 1212. As an example, consider FIG. 13.

There, a user can change the default assignment of tools and/or objects to the main bezel menu slots via a drag and drop operation. For example, in the top-most portion of FIG. 13, a user touches down on a new tool 1300. The user then proceeds to drag tool 1300 into or onto one of the slots of bezel menu 1210. This gesture causes the object previously associated with the slot to be replaced with the new object dropped by the user.

Figure 14:
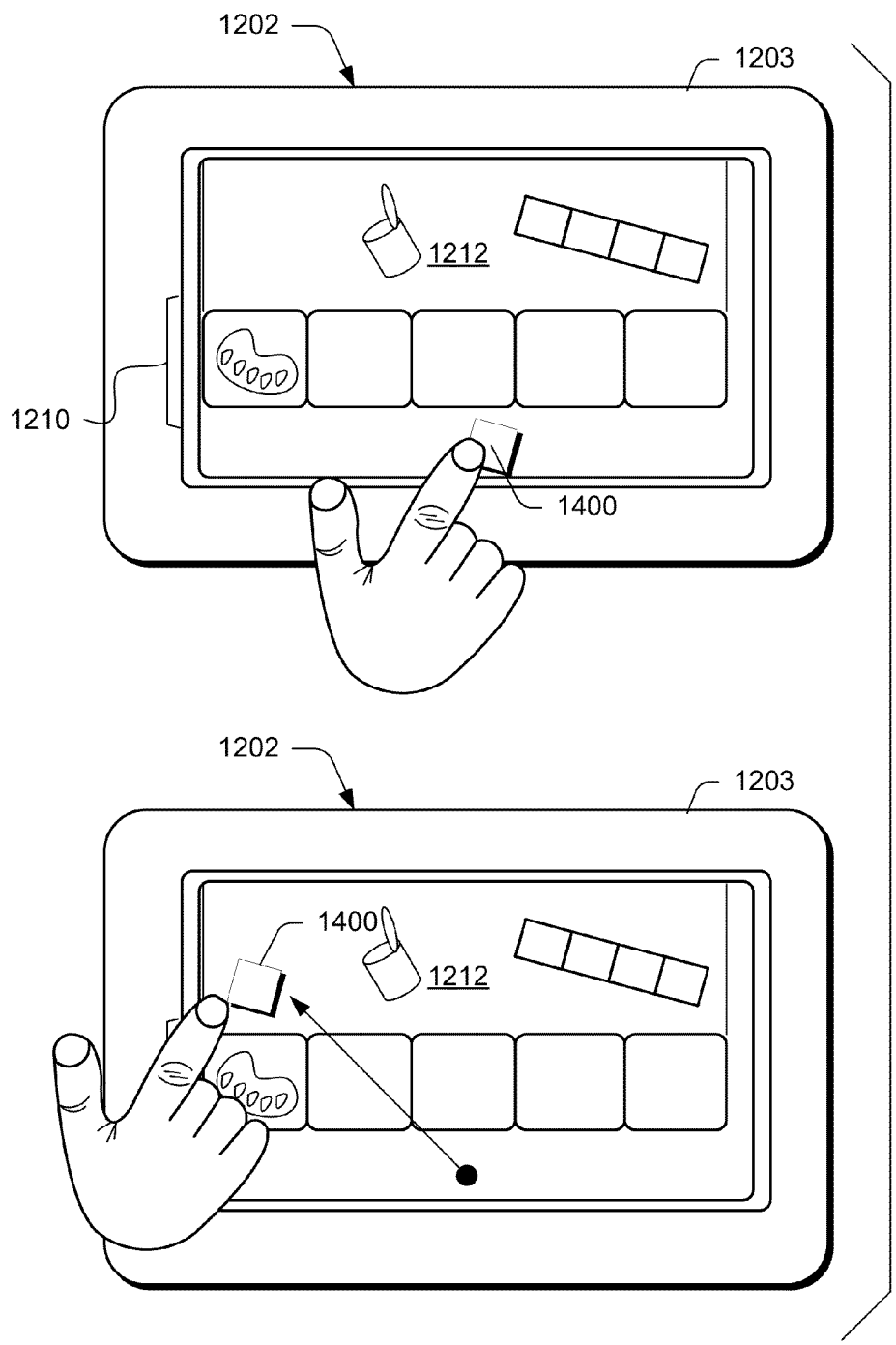
FIG. 14 illustrates an example computing device in accordance with one or more embodiments.

Alternately or additionally, the user can also drag content from the page or canvas into the drawer 1212. As an example, consider FIG. 14. There, the user has touched down on an object 1400 on the page or canvas and has dragged the object into drawer 1212. By lifting the finger, the object 1400 is deposited into the drawer 1212.

It is to be appreciated and understood that while one drawer has been described above, various other embodiments can utilize multiple drawers. For example, other edges of the display device can be associated with different drawers. These different drawers may hold different tools, objects, or other content. On dual or multiple-screen devices, the drawers for each screen edge may be identical or may be differentiated. In at least some embodiments, the multiple drawers may also be accessed on each screen edge by sliding orthogonal to the direction that the drawer is opened. This can be done either by a single touch, and/or multiple touches. If the bezel menu extends all the way to the screen edges, it can also be done by a bezel gesture from the orthogonal edge.

Figure 12:
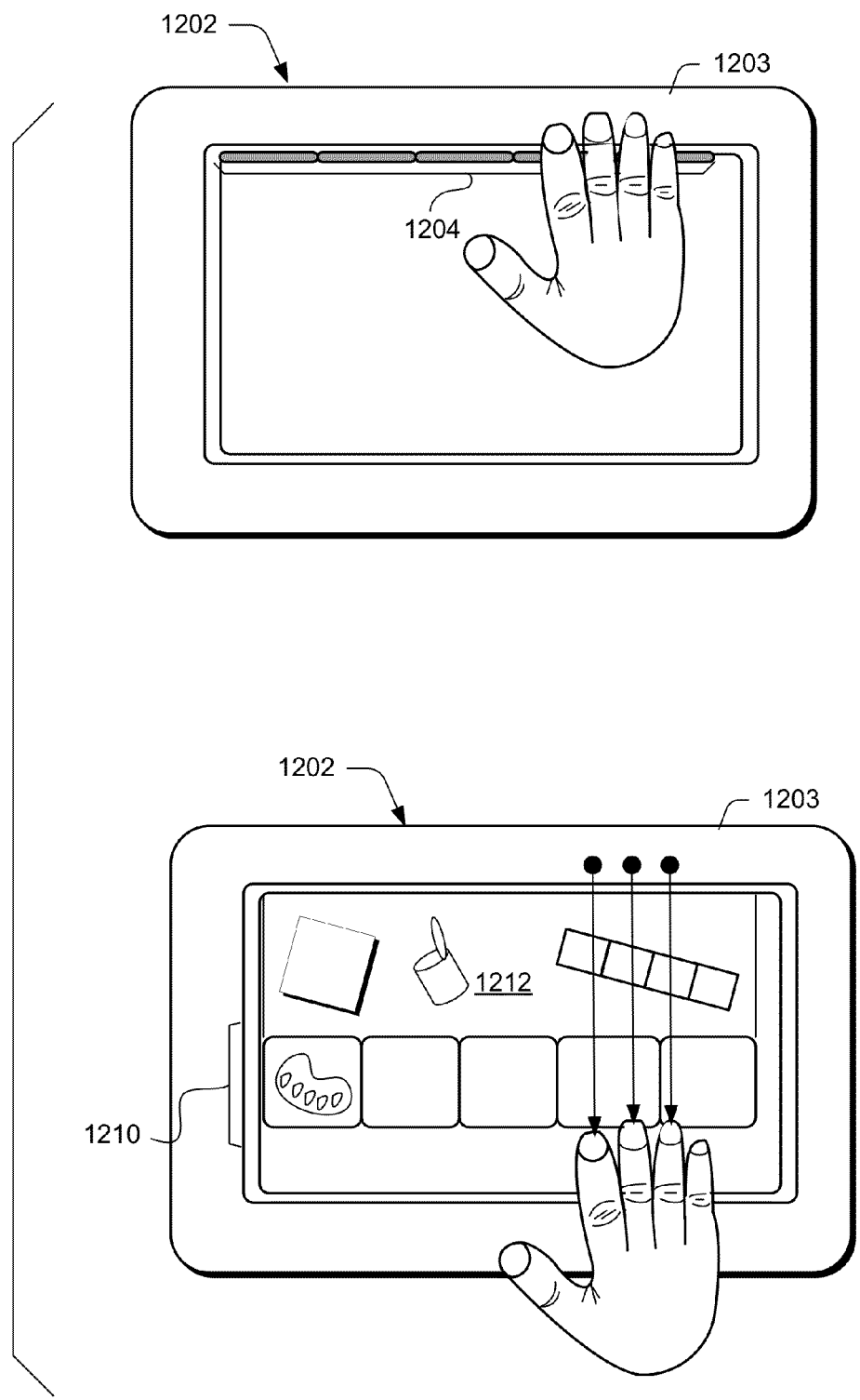
FIG. 12 illustrates an example computing device in accordance with one or more embodiments.

In the embodiment described just above, multiple touches were used to access drawer 1212. Specifically, as illustrated in FIG. 12, three touches were used to access the illustrated drawer. In one or more embodiments, different numbers of touches can be utilized to access different drawers. For example, two touches can be mapped to a first drawer, three touches can be mapped to a second drawer, four touches can be mapped to a third drawer, and so on. Alternately or additionally, the spacing between multiple touches and variances therebetween can be mapped to different functionalities. For example, a two-finger touch with a first spacing might be mapped to a first functionality; and, a two-finger touch with a second, greater spacing might be mapped to a second different functionality.

Figure 15:
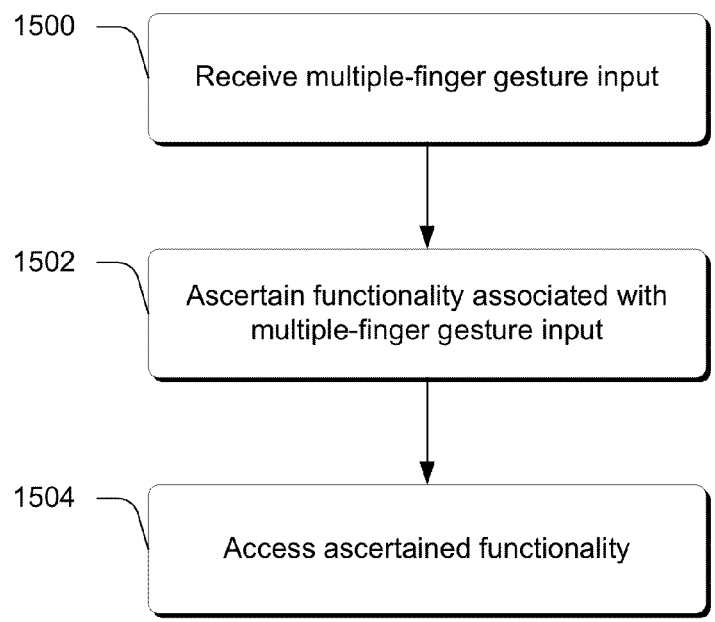
FIG. 15 is a flow diagram that describes the steps in a method in accordance with one or more embodiments.

FIG. 15 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 1500 receives multiple-finger gesture input. Any suitable type of gesture can be utilized including, by way of example and not limitation, bezel gesture input such as that described above. Step 1502 ascertains a functionality associated with the multiple-finger gesture input. Examples of functionalities are described above. Step 1504 accesses the ascertained functionality. Examples of how this can be done are described above.

Figure 16:
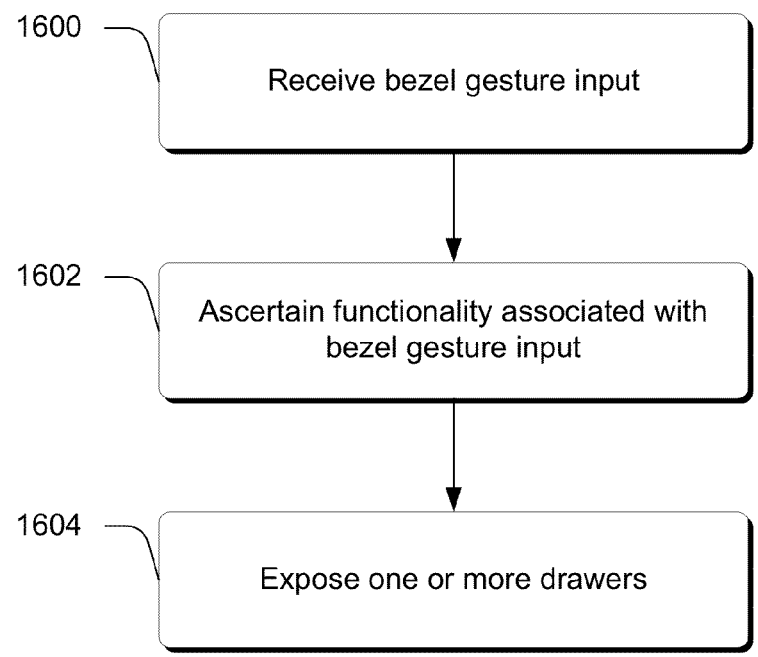
FIG. 16 is a flow diagram that describes the steps in a method in accordance with one or more embodiments.

FIG. 16 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 1600 receives a bezel gesture input. Examples of bezel gesture inputs are described above. Step 1602 ascertains a functionality associated with the bezel gesture input. In this particular embodiment, the functionality associated with the bezel gesture input is one that is associated with accessing one or more drawers. Step 1604 exposes one or more drawers for the user. Examples of how this can be done are described above.

Radial Menus

Figure 17:
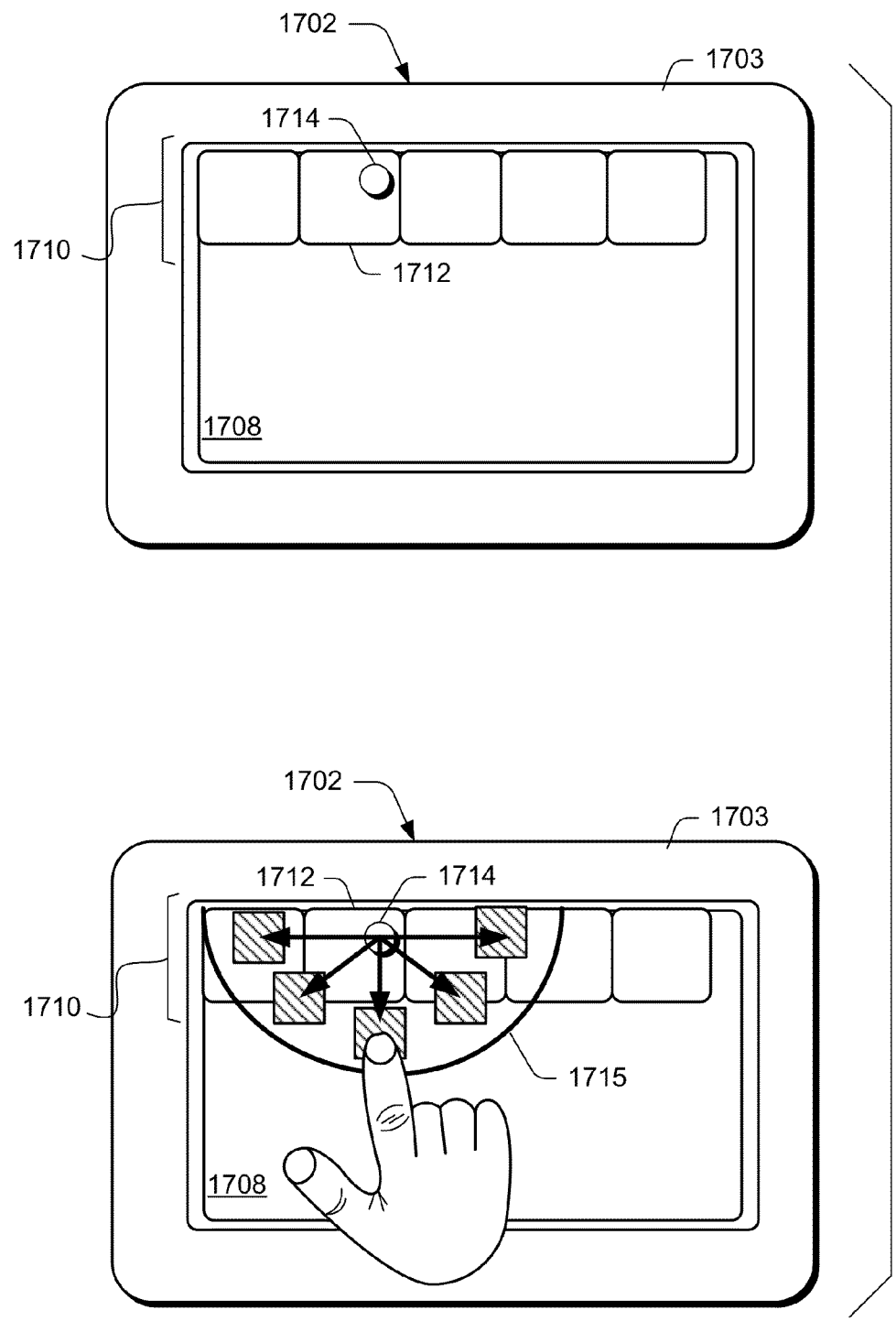
FIG. 17 illustrates an example computing device in accordance with one or more embodiments.

In at least some embodiments, so-called radial menus can be utilized in connection with menus such as bezel menus. Although radial menus are described, other types of menus can be used without departing from the spirit and scope of the claimed subject matter. For example, pull down menus can be used in conjunction with bezel menus. One of the general ideas associated with radial menus is that a user can touch down at a certain location and stroke or slide their finger a certain direction to access and implement a particular functionality or menu command. The presence of a radial menu can be indicated by a small icon associated with a larger icon or slot of the bezel menu. As an example, consider FIG. 17.

There, device 1702 includes a bezel 1703 and a bezel menu 1710 that has been exposed on display device 1708 as described above. In the illustrated and described embodiment, bezel menu 1710 includes multiple selectable icons or slots, one of which is designated at 1712. Each of the icons or slots is associated with a different functionality such as, for example, paint functionality, pen functionality, note functionality, object creation, object editing, and the like. It is to be appreciated and understood, that any type of functionality can be associated with the icons or slots.

As noted above, bezel menu 1710 can enable a user to access and activate commands, tools, and objects. The bezel menu can be configured to respond to both touch input and pen input. Alternately or additionally, the bezel menu can be configured to respond only to touch input. In the illustrated and described embodiment, icon or slot 1712 includes a radial menu icon 1714 that gives a clue to the user that one or more radial menus, for example radial menu 1715, is associated with this particular icon or slot. In the illustrated and described embodiment, the radial menu 1715 can be accessed in any suitable way, e.g. through a pen or touch. For example, in at least some embodiments, the radial menu 1715 can be accessed by hovering a pen over or near radial menu icon 1714. Alternately or additionally, a pen or finger can be used to pull down the radial menu 1715. Alternately or additionally, the radial menus 1715 can be accessed through a tap-and-hold of the pen or finger on or near the radial menu icon 1714. In some embodiments, tapping on the radial menu icon triggers a default action which may or may not be different than the action associated with tapping on the bezel menu slot.

Once the radial menu 1715 is exposed, the user can access various functionalities or commands by touching down on or near radial menu icon 1714 and stroking in a particular direction. In the illustrated and described embodiment, five different directions are indicated by the arrows. Each direction corresponds to a different functionality or command. Each functionality or command is represented, in the drawing, by a cross-hatched square. In at least some embodiments, each icon or slot 1712 has a default functionality or command. By selecting a particular radial menu functionality or command, the default functionality or command may be replaced by the selected functionality or command.

In at least some embodiments, the number of options presented by a radial menu can change depending on the location of the corresponding slot or icon with which the radial menu is associated. For example, in the illustrated and described embodiment, slot or icon 1712 includes five options for the user. Radial menus associated with slots or icons that appear at the ends of the bezel menu 1710 may have fewer options due to spacing constraints. Alternately or additionally, radial menus associated with slots or icons that appear as part of an exposed drawer may have more selectable options.

In at least some embodiments, radial menus can be implemented to include both a novice mode and an expert mode. In the novice mode, the radial menu can be fully exposed to enable users who are unfamiliar with its accessible functionalities or commands to be visually guided through the selection process. In the expert mode, intended for users who are familiar with the content and behavior of radial menus, the radial menu might not be exposed at all. Rather, a quick touch-and-stroke gesture associated with an icon or slot, such as icon 1712, may enable the radial menu's functionality or command to be accessed directly.

Figure 18:
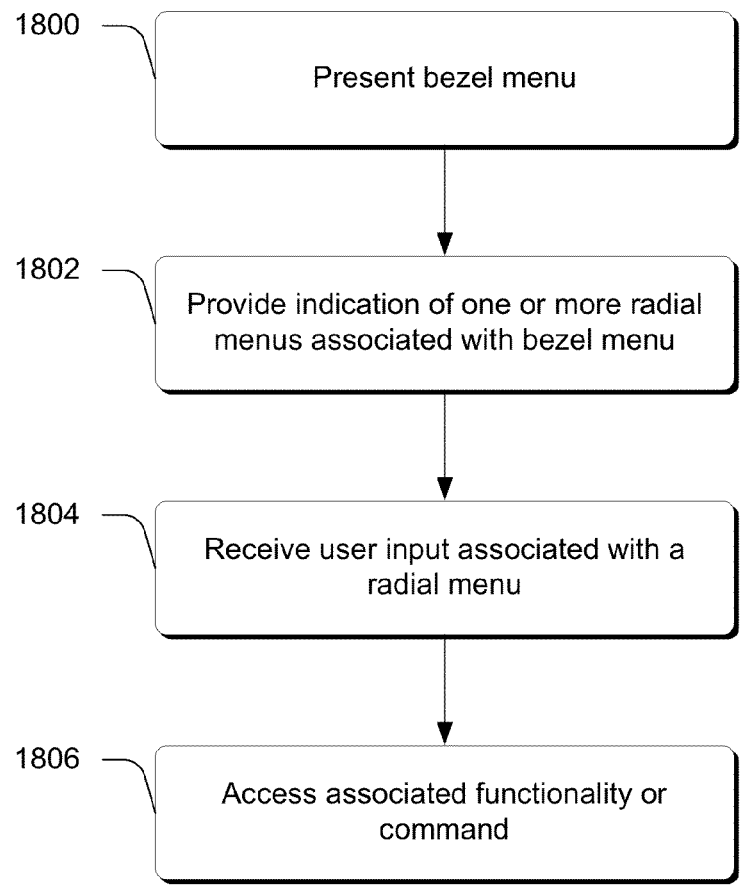
FIG. 18 is a flow diagram that describes the steps in a method in accordance with one or more embodiments.

FIG. 18 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 1800 presents a bezel menu. Examples of bezel menus are provided above. Step 1802 provides an indication of one or more radial menus associated with the bezel menu. In the illustrated and described embodiment, the indication resides in the form of a radial menu icon that appears on a slot or icon of the bezel menu. Step 1804 receives user input associated with one of the radial menus. Examples of how this can be done are provided above. For example, in at least some embodiments, a radial menu can be visually presented to the user so that the user can then touch and stroke in a particular direction to provide the input. Alternately or additionally, a radial menu need not necessarily be visually presented. Rather, a user who is familiar with the radial menu's content and behavior can correspondingly gesture, as described above, to provide the input. Step 1806 accesses, responsive to the received user input, and the associated functionality or command.

In one or more embodiments, the bezel menu may or may not be rotated when the screen orientation is rotated. For example, in some instances it may be desirable to not rotate a bezel menu when the screen orientation is rotated. This may be particularly relevant in applications where the content should not be rotated, e.g., a journal page or a sketch pad where the user rotates the screen to afford different drawing angles. In other instances, it may be desirable to rotate the bezel menu when the screen orientation is rotated. By default, it may be desirable to support the same number of bezel menu slots on all four edges of the screen so that menu items can be rotated from the long edge or screen to the short edge of the screen without losing some items.

Alternately or additionally, bezel menus can be customizable per screen orientation to enable different numbers of slots to be used on the long and short edges of the screen. In some instances, some edges of the screen may be left without bezel items depending on the screen orientation. For example, the left and bottom edges, for a right-handed individual, may be more likely to be swiped by accident, and may be left without bezel menus if desired.

On and Off Screen Gestures and Combinations—Page/Object Manipulation

Figure 19:
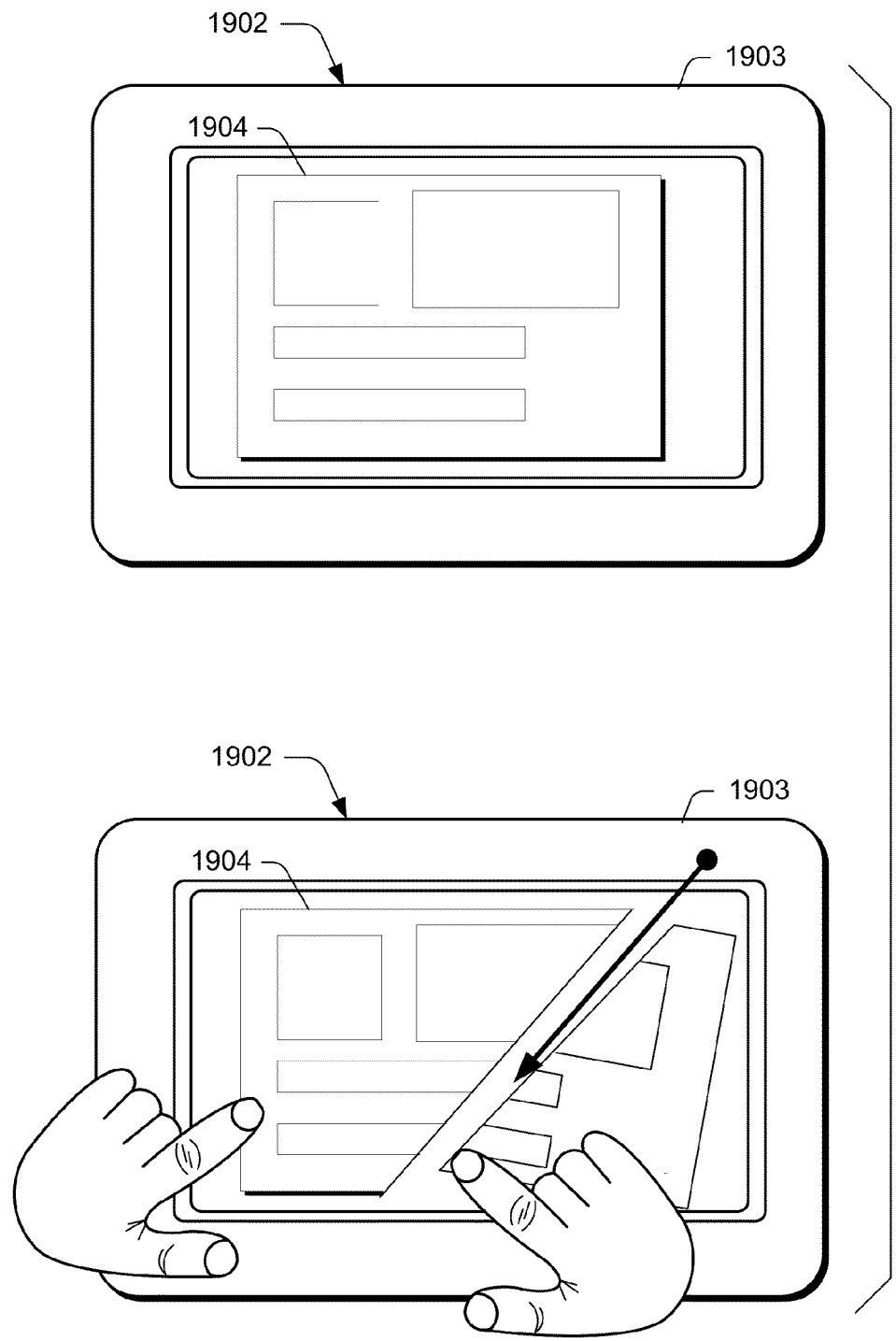
FIG. 19 illustrates an example computing device in accordance with one or more embodiments.

In one or more embodiments, on and off screen gesture combinations can be utilized to manipulate pages and/or other objects. For example, combinations of on and off screen gestures can include gestures in which input is received on the screen relative to an object using one hand, and additional input in the form of a bezel gesture is received relative to the object using the same or a different hand. Any suitable type of gesture combinations can be used. As an example, consider FIG. 19.

There, a device 1902 includes a bezel 1903. A page 1904 is displayed on the display device (not designated). In the illustrated and described embodiment, a tear operation is performed using a combination of on and off screen gestures. Specifically, in the bottommost portion of FIG. 19, a user's left hand or left index finger holds an object which, in this example, comprises page 1904. Using the right hand, the user initiates a bezel gesture starting on bezel 1903 and moving in the direction of the indicated arrow through a portion of page 1904. By virtue of using a single finger to indicate the tear operation, a partial tear of the page is performed. A tear operation can be implemented by creating a bitmap of the portion of the page that has been torn away and rendering only that portion of the page that was not torn away. Alternately or additionally, an object can be created to represent the torn-away portion. In this created object, objects appearing in the torn-away portion can be created to represent items appearing on the page.

In one or more other embodiments, a tear operation can be implemented using multiple fingers. In these embodiments, the multiple finger input can be mapped to an operation that completely tears a page out of the canvas or book in which the page appears.

In at least some embodiments, the direction of tearing can carry with it different semantics. For example, a top-to-bottom tear may tear out and delete a page. A bottom-to-top tear may tear out and allow dragging of the page to a new location.

Figure 20:
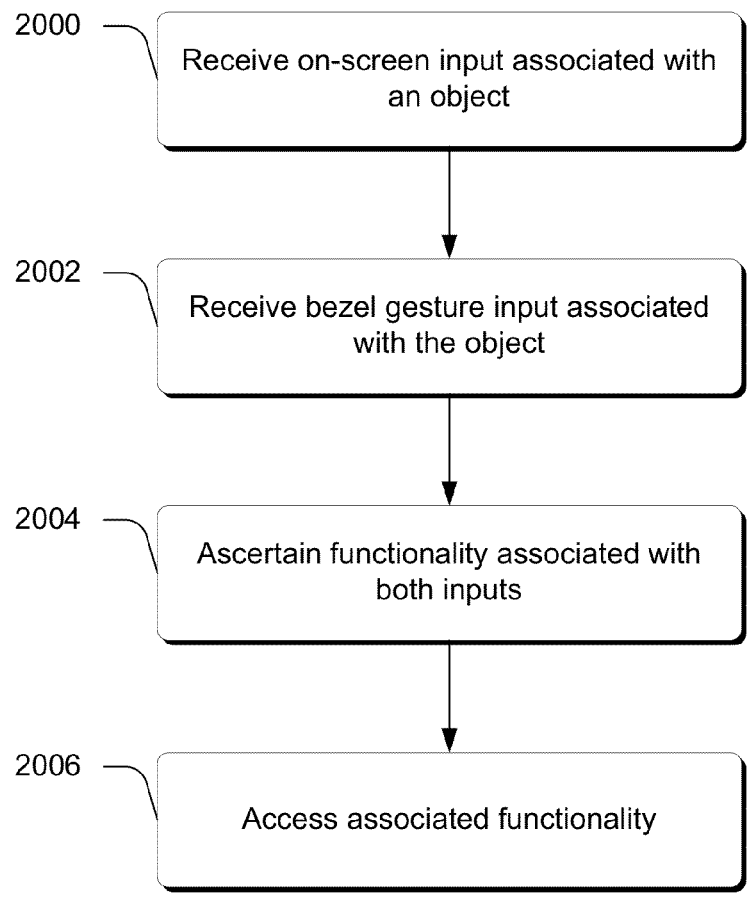
FIG. 20 is a flow diagram that describes the steps in a method in accordance with one or more embodiments.

FIG. 20 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 2000 receives on-screen input associated with an object. Any suitable type of on-screen input can be received including, by way of example and not limitation, single-finger input and/or multiple-finger input. Step 2002 receives a bezel gesture input associated with the object. Any suitable type of bezel gesture input can be received including, by way of example and not limitation, single-finger input and/or multiple-finger input. Step 2004 ascertains functionality associated with both inputs. Step 2006 accesses the associated functionality. Any suitable type of functionality can be associated with the combination of on-screen and bezel gesture inputs, an example of which is provided above.

Other page manipulations can be provided through the use of gestures, including bezel gestures. For example, page flipping and page saving (also termed "page pocketing") can be provided as described below.

Figure 21:
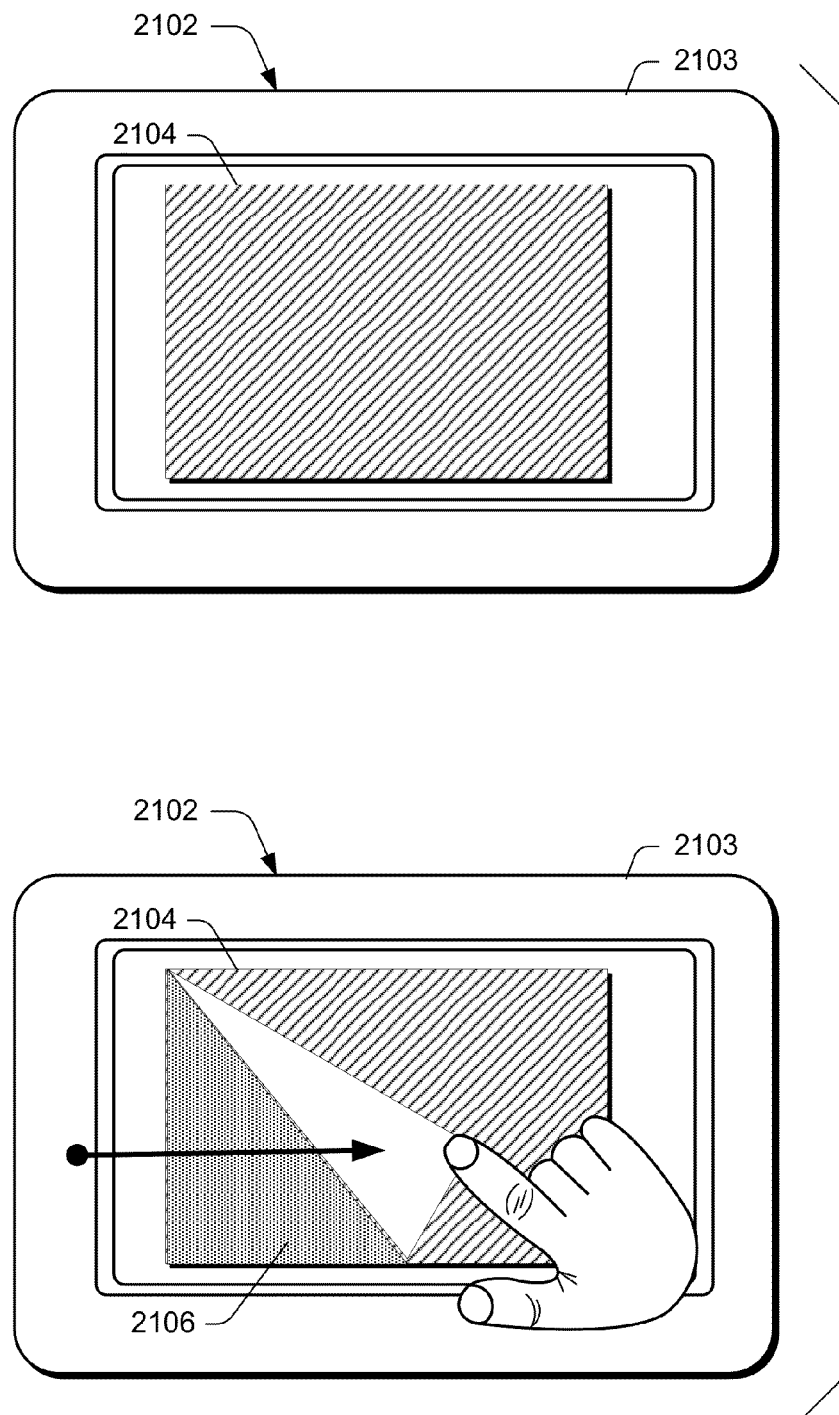
FIG. 21 illustrates an example computing device in accordance with one or more embodiments.

As an example, consider FIG. 21. There, a device 2102 includes a bezel 2103 and a page 2104. As shown in the bottommost portion of FIG. 21, a user can flip to a previous page by using a bezel gesture that starts on bezel 2103 and proceeds rightward across the screen in the direction of the arrow. Doing so reveals the previous page 2106. Likewise, to turn to the next page, a user would utilize a similar bezel gesture, but only in the opposite direction. Using the page flipping gesture, the user's finger can lift at any suitable location on the screen.

In one or more embodiments, the semantics of page flipping gestures can vary from that described above. For example, in some instances a page flipping gesture can be initiated as described above. However, if the user pauses with their finger on the screen, multiple pages can be flipped through. Alternately or additionally, pausing the finger on the screen in the middle of a page flipping gesture can cause additional controls, such as section tabs, command palettes, or a bezel menu to appear.

Alternately or additionally, in at least some embodiments, the further a user's finger progresses across the screen, the more pages can be flipped. Alternately or additionally, multiple pages can be flipped by initiating the page flipping gesture as described above, and then moving the finger in a circular motion, either clockwise or counterclockwise. In this instance, clockwise motion would represent forward flipping, and counterclockwise motion would represent backwards flipping. In this implementation, a circle may be fitted to the last N samples of motion. The speed of motion can be a function of the diameter of the circle. Note that in this implementation, the user does not have to circle around any particular location on the screen, or even to draw a well formed circle at all. Rather, any curvilinear motion can get mapped to page flipping in an intuitive manner, while also allowing the user to easily stop and reverse course to flip in the opposite direction.

In at least some embodiments, a similar gesture can be used to save or "pocket" a page. In these embodiments, rather than the gesture terminating on the screen, as in the page flipping example, the gesture can terminate on a bezel portion or other structure that lies across the screen from where the gesture originated. As an example, consider FIGS. 22 and 23.

Figure 22:
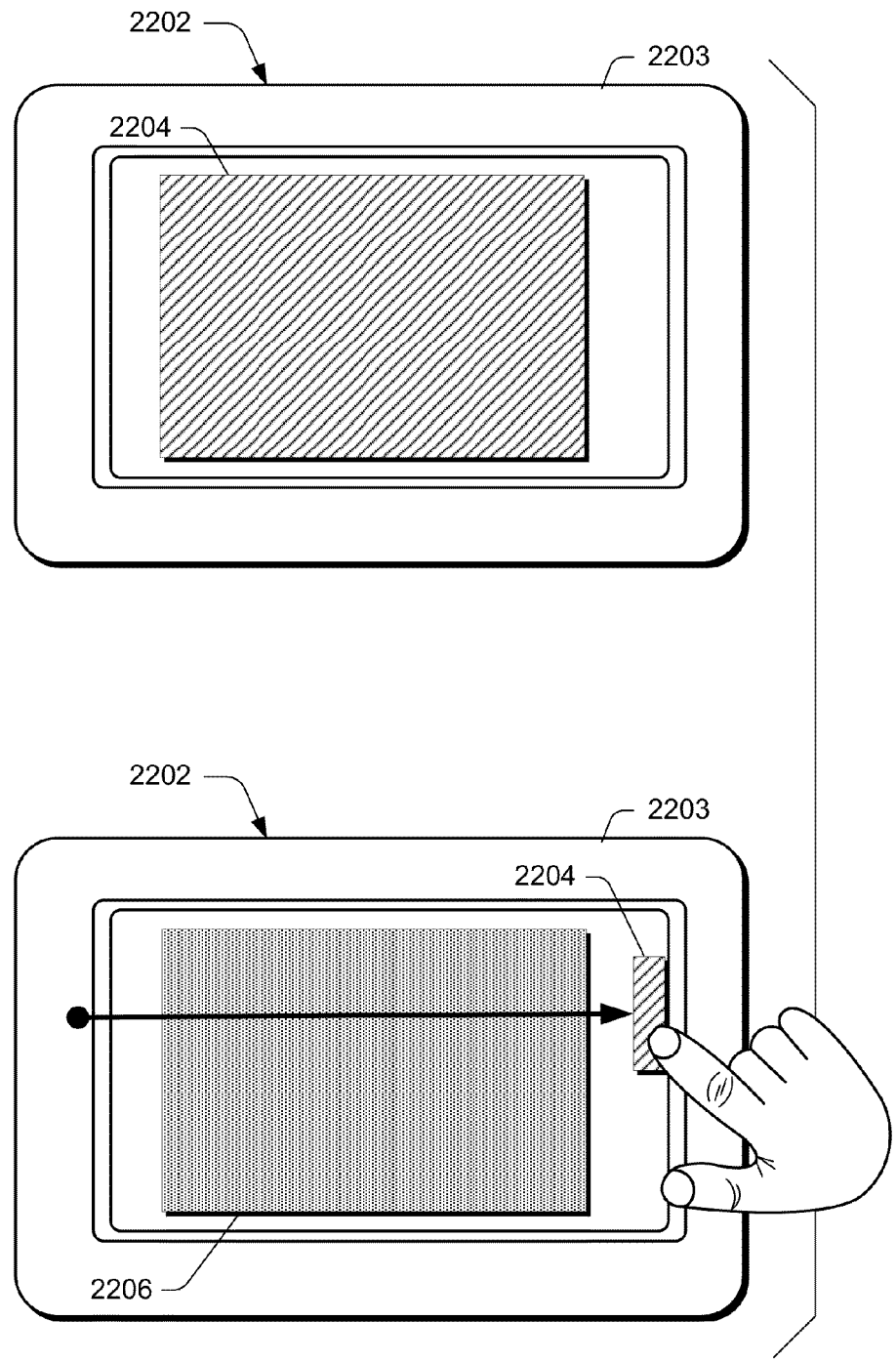
FIG. 22 illustrates an example computing device in accordance with one or more embodiments.

There, a device 2202 includes a bezel 2203 and a page 2204. As shown in the bottommost portion of FIG. 22, a user can save or pocket a page by using a bezel gesture that starts on bezel 2203 and proceeds rightward across the screen in the direction of the arrow to a bezel portion that lies opposite of where the gesture originated. Doing so reveals another page 2206. In one or more embodiments, a distance threshold can be defined such that, prior to the threshold, the page flipping experience, such as that described and shown in FIG. 21 can be provided. After the defined distance threshold, a different page-saving or page-pocketing experience can be provided. For example, in the FIG. 22 illustration, page 2204 has been reduced to a thumbnail. The page-saving or page-pocketing experience can be provided by a combination of passing the minimum distance threshold after a minimum timeout, such as ⅓ second, when most page flipping gestures would have been completed. In at least some embodiments, if the user lifts their finger prior to reaching the opposite-side bezel, a page flipping operation can be presumed.

Figure 23:
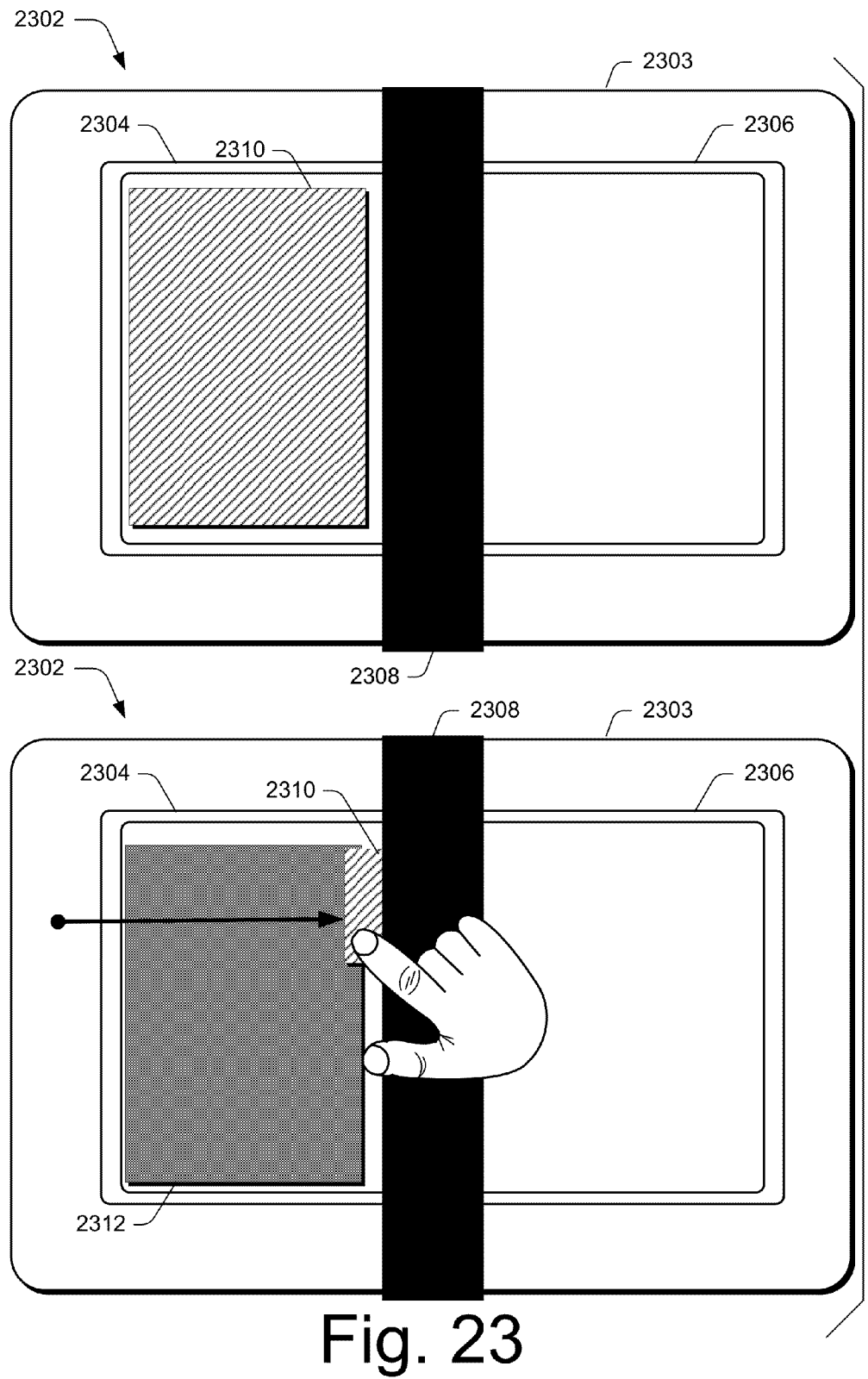
FIG. 23 illustrates an example computing device in accordance with one or more embodiments.

FIG. 23 illustrates a device 2302 that includes a bezel 2303 and two separate display screens 2304, 2306 separated by a spine 2308. Spine 2308 can be considered as comprising part of the bezel or physical structure of the device. A page 2310 is illustrated as being displayed on display screen 2304.

As shown in the bottommost portion of FIG. 23, a user can save or pocket a page by using a bezel gesture that starts on bezel 2303 and proceeds rightward across the screen in the direction of the arrow to spine 2308 that lies across the screen 2304 from where the gesture originated. Doing so reveals another page 2312. In one or more embodiments, a distance threshold can be defined such that, prior to the threshold, the page flipping experience, such as that described and shown in FIG. 21 can be provided. After the defined distance threshold, a different page-saving or page-pocketing experience can be provided. For example, in the FIG. 23 illustration, page 2310 has been reduced to a thumbnail. The page-saving or page-pocketing experience can be provided after a minimum timeout, such as ⅓ second, when most page flipping gestures would have been completed. In at least some embodiments, if the user lifts their finger prior to reaching the spine 2308, a page flipping operation can be presumed.

In one or more embodiments, portions of pages can be saved or pocketed. As an example, consider FIG. 24. There, a device 2402 includes a bezel 2403 and two separate display screens 2404, 2406 separated by a spine 2408. Spine 2408 can be considered as comprising part of the bezel or physical structure of the device. A page 2410 is illustrated as being displayed on display screen 2404.

Figure 24:
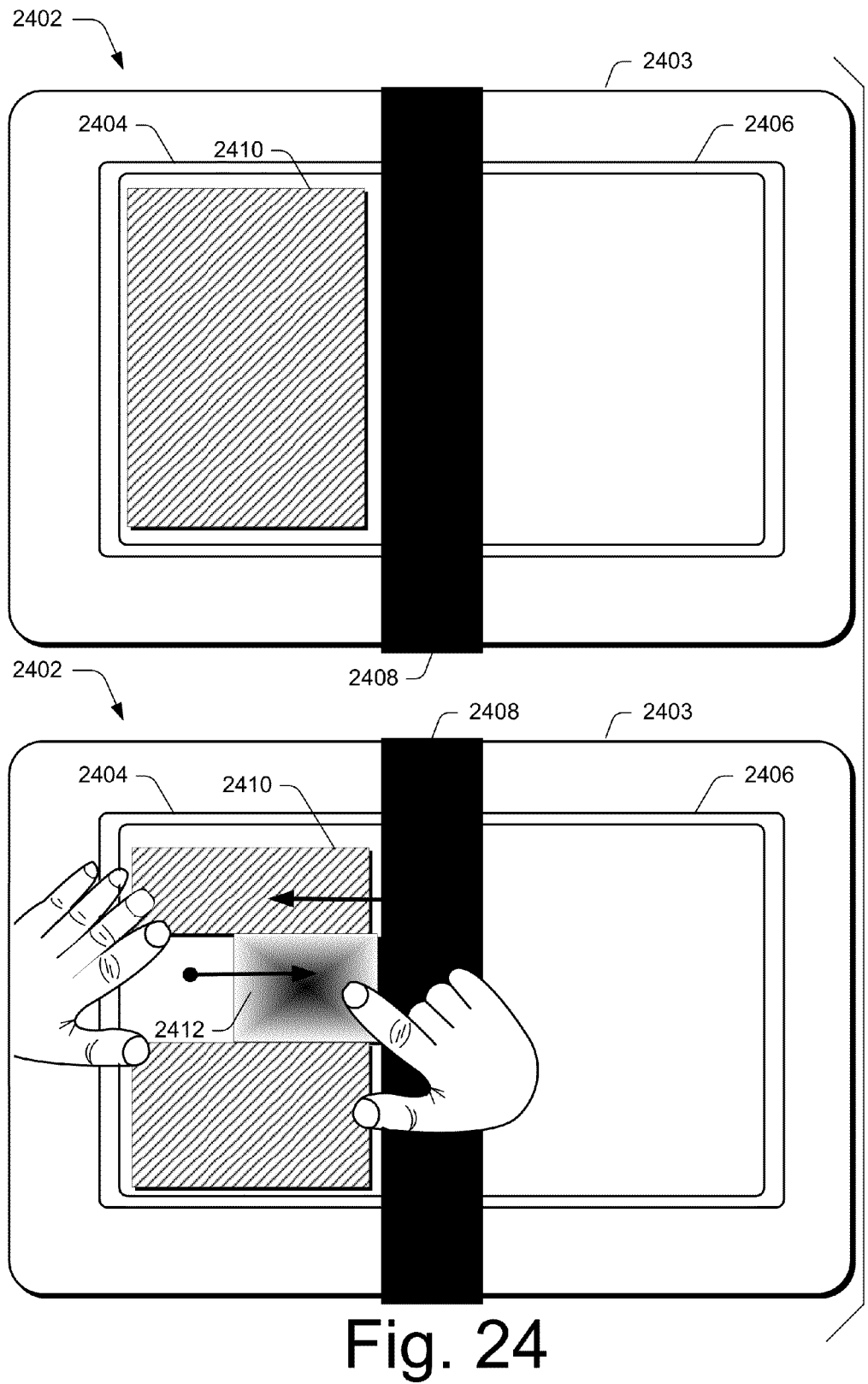
FIG. 24 illustrates an example computing device in accordance with one or more embodiments.

As shown in the bottommost portion of FIG. 24, a user can save or pocket a portion of the page by using a bezel gesture. First, two fingers of a user's hand (in this case the left hand) sweep onto the screen from the bezel. In this particular instance, the user's left-hand initiates the bezel gesture from the spine 2408 and moves in the direction of the top-most arrow. The region between the fingers—here illustrated at 2412—is then highlighted. The user's other hand can then sweep across the highlighted area to tear out the highlighted portion of the page and pocket or save the highlighted portion as shown. In one or more embodiments, this gesture can be supported on any of the four edges of the screen, thus allowing horizontal or vertical strips to be torn from either screen by either right-handed or left-handed users. In at least some embodiments, the torn portion of the page can have two torn edges and two clean-cut edges to distinguish it from pocketed pages or other pocketed objects.

Figure 25:
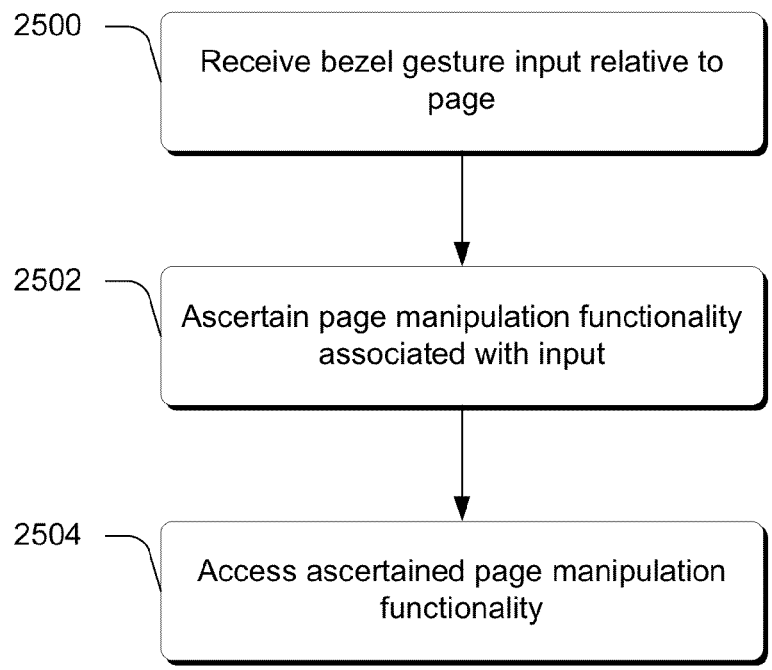
FIG. 25 is a flow diagram that describes the steps in a method in accordance with one or more embodiments.

FIG. 25 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 2500 receives bezel gesture input relative to a page. Step 2502 ascertains page manipulation functionality associated with the input. Any suitable type of page manipulation functionality can be ascertained, examples of which are provided above. Step 2504 accesses the ascertained page manipulation functionality.

Figure 26:
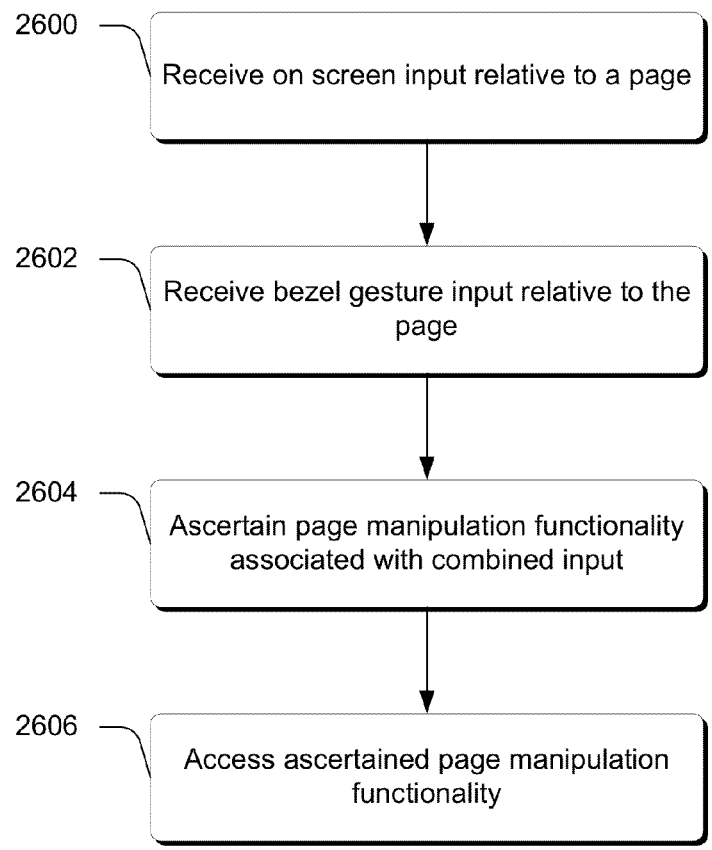
FIG. 26 is a flow diagram that describes the steps in a method in accordance with one or more embodiments.

FIG. 26 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 2600 receives on-screen input relative to a page. Any suitable type of input can be received. In at least some embodiments, the received screen input comprises a touch input or a stylus input. Step 2602 receives a bezel gesture input relative to the page. Any suitable type of bezel gesture input can be received, examples of which are provided above. Step 2604 ascertains page manipulation functionality associated with the combined input. Examples of page manipulation functionality are provided above. Step 2606 accesses the ascertained page manipulation functionality for purposes of implementing the functionality relative to the page.

Thus, page flipping and page saving operations can be unified through the use of bezel gestures that included at least some common aspects. Unification of these two operations yields simplicity and facilitates discoverability for users.

Figure 27:
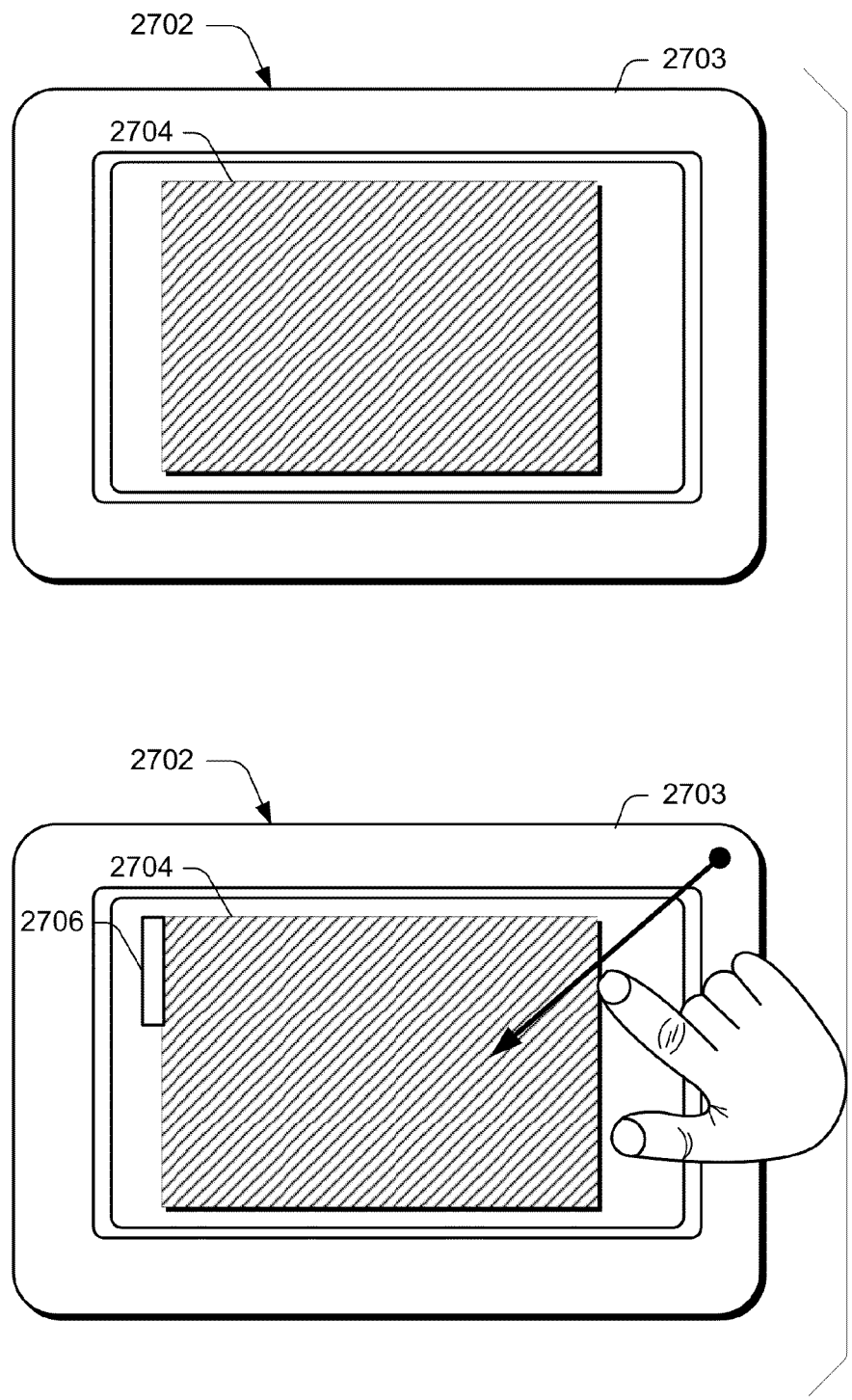
FIG. 27 illustrates an example computing device in accordance with one or more embodiments.

In one or more embodiments, other page manipulation operations can be implemented through the use of bezel gestures. As an example, consider FIG. 27. There, a device 2702 includes a bezel 2703. A page 2704 is displayed on the display device (not designated). In the illustrated and described embodiment, a bookmark tab can be created through the use of a bezel gesture. Specifically, as shown in the bottommost portion of FIG. 27, a bookmark tab 2706 can be created by initiating a gesture on the bezel 2703 and moving on to page 2704. In the illustrated and described embodiment, the bezel gesture that creates the bookmark tab originates on a corner of the bezel as shown. Any suitable location on the bezel can be utilized for creating a bookmark tab.

Figure 28:
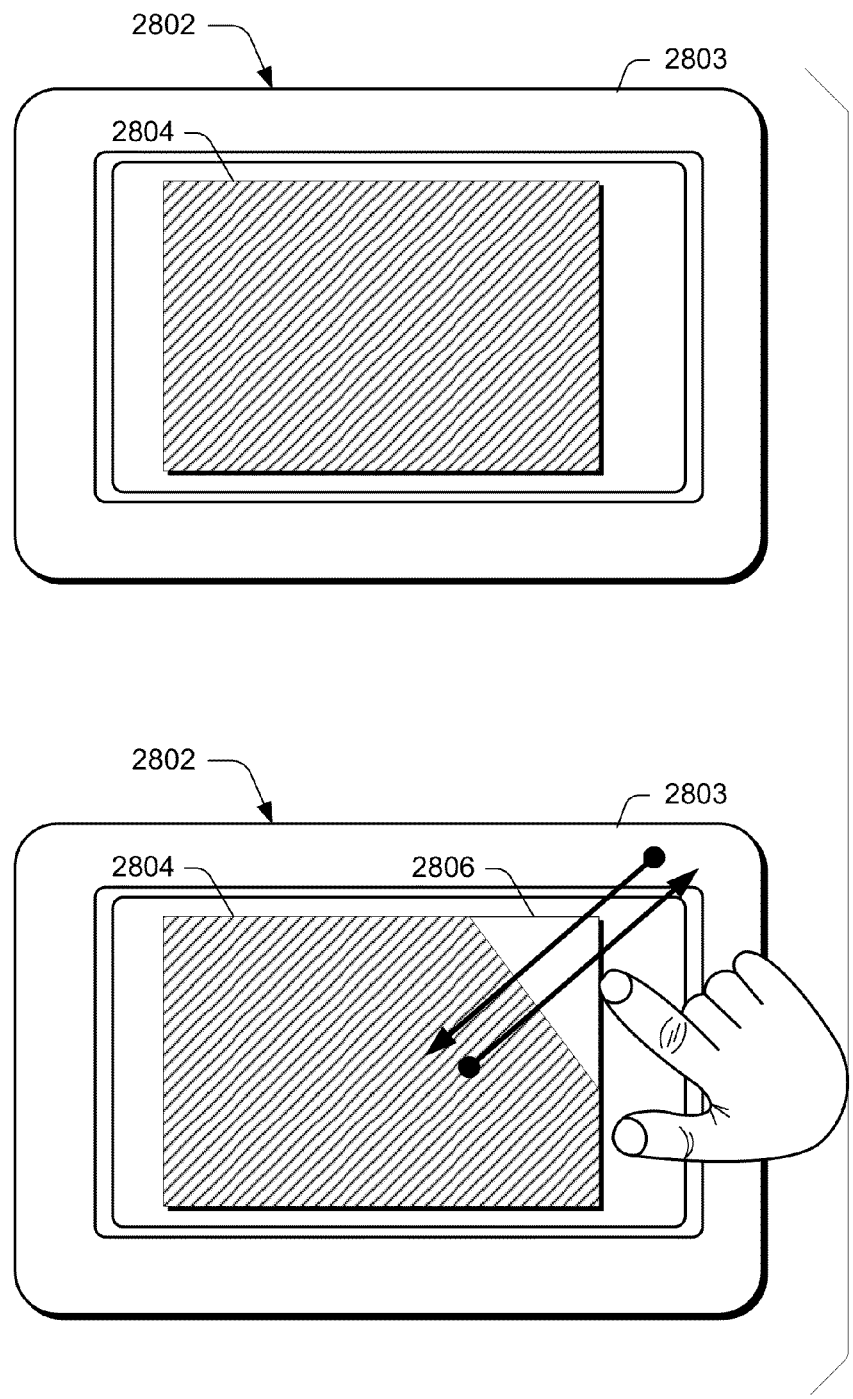
FIG. 28 illustrates an example computing device in accordance with one or more embodiments.

Alternately or additionally, bezel gestures can be utilized to dog-ear a page. As an example, consider FIG. 28. There, a device 2802 includes a bezel 2803. A page 2804 is displayed on the display device (not designated). In the illustrated and described embodiment, a dog-ear can be created through the use of a bezel gesture. Specifically, as shown in the bottommost portion of FIG. 28, a dog-ear 2806 can be created by initiating a gesture on the bezel 2803 and moving onto page 2804 and then exiting the page in an opposite direction as illustrated by the arrows. In the illustrated and described embodiment, the bezel gesture that creates the dog-ear originates on a corner of the bezel as shown. Any suitable location on the bezel can be utilized for creating a dog-ear. For example, in other embodiments, a dog-ear can be created through a bezel gesture that cuts across a corner of the page.

Figure 29:
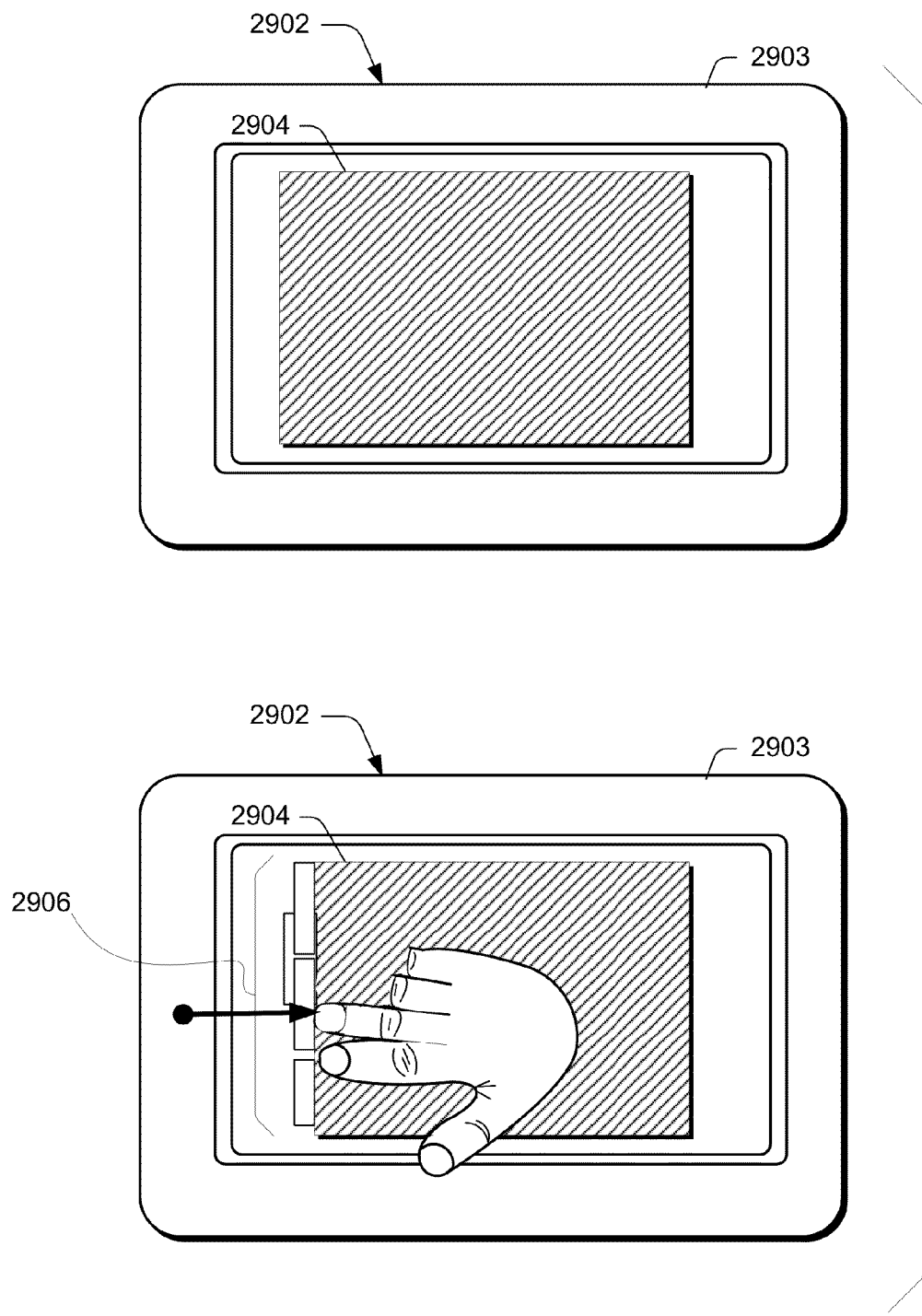
FIG. 29 illustrates an example computing device in accordance with one or more embodiments.

In one or more embodiments, gestures can be utilized to expose tabs such as user-created or predefined tabs in a document. As an example, consider FIG. 29. There, a device 2902 includes a bezel 2903. A page 2904 is displayed on the display device (not designated). In one or more embodiments, tabs can be exposed by utilizing a bezel gesture that pulls at the edge of page 2904 as shown to expose a tab structure 2906. As the bezel gesture moves onto the screen, the page is pulled slightly to the right to expose tab structure 2906. In this instance, the gesture includes two or more fingers that are held together as shown, rather than with a gap therebetween.

In one or more embodiments, continuing to drag the page can reveal further structure. For example, continuing to drag the page can expose a table organizational view to the left of page 2904. In at least some embodiments, continuing the gesture across the entire page can save or pocket the entire page as described above.

Figure 30:
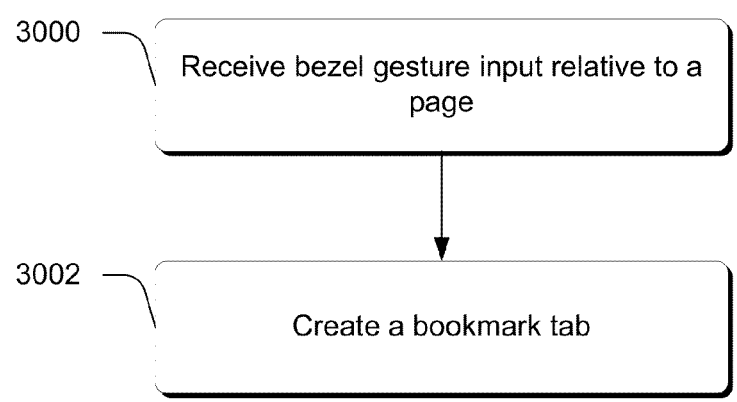
FIG. 30 is a flow diagram that describes the steps in a method in accordance with one or more embodiments.

FIG. 30 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 3000 receives a bezel gesture input relative to a page. Step 3002 creates a bookmark tab relative to the page, responsive to receiving the bezel gesture input. Examples of how this can be done are provided above.

Figure 31:
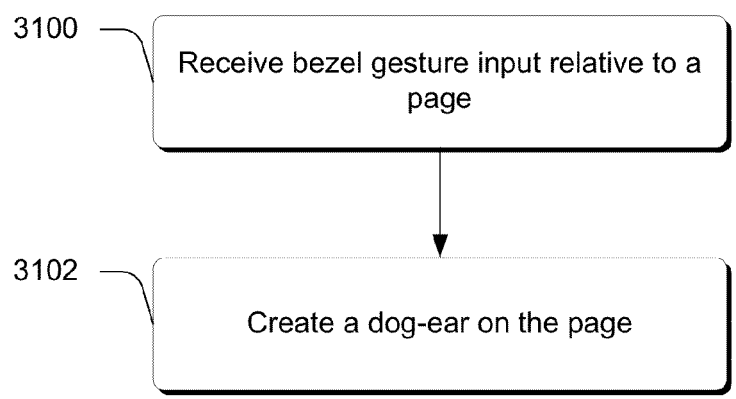
FIG. 31 is a flow diagram that describes the steps in a method in accordance with one or more embodiments.

FIG. 31 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 3100 receives a bezel gesture input relative to a page. Step 3102 creates a dog-ear on the page, responsive to receiving the bezel gesture input. Examples of how this can be done are provided above.

Figure 32:
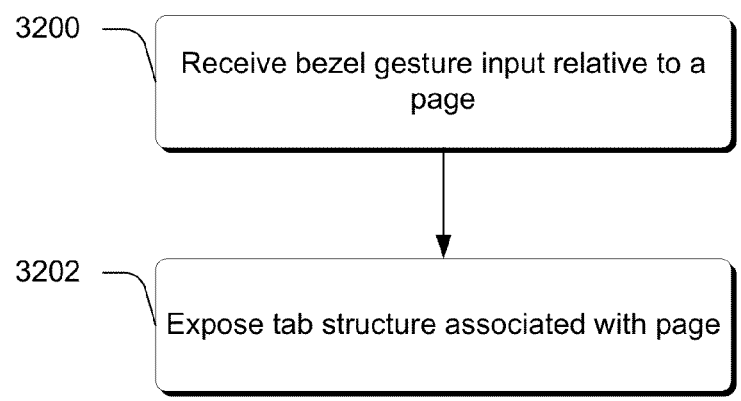
FIG. 32 is a flow diagram that describes the steps in a method in accordance with one or more embodiments.

FIG. 32 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Step 3200 receives a bezel gesture input relative to a page. Step 3202 exposes tab structure associated with the page. Examples of how this can be done are provided above.

Example Device

Figure 33:
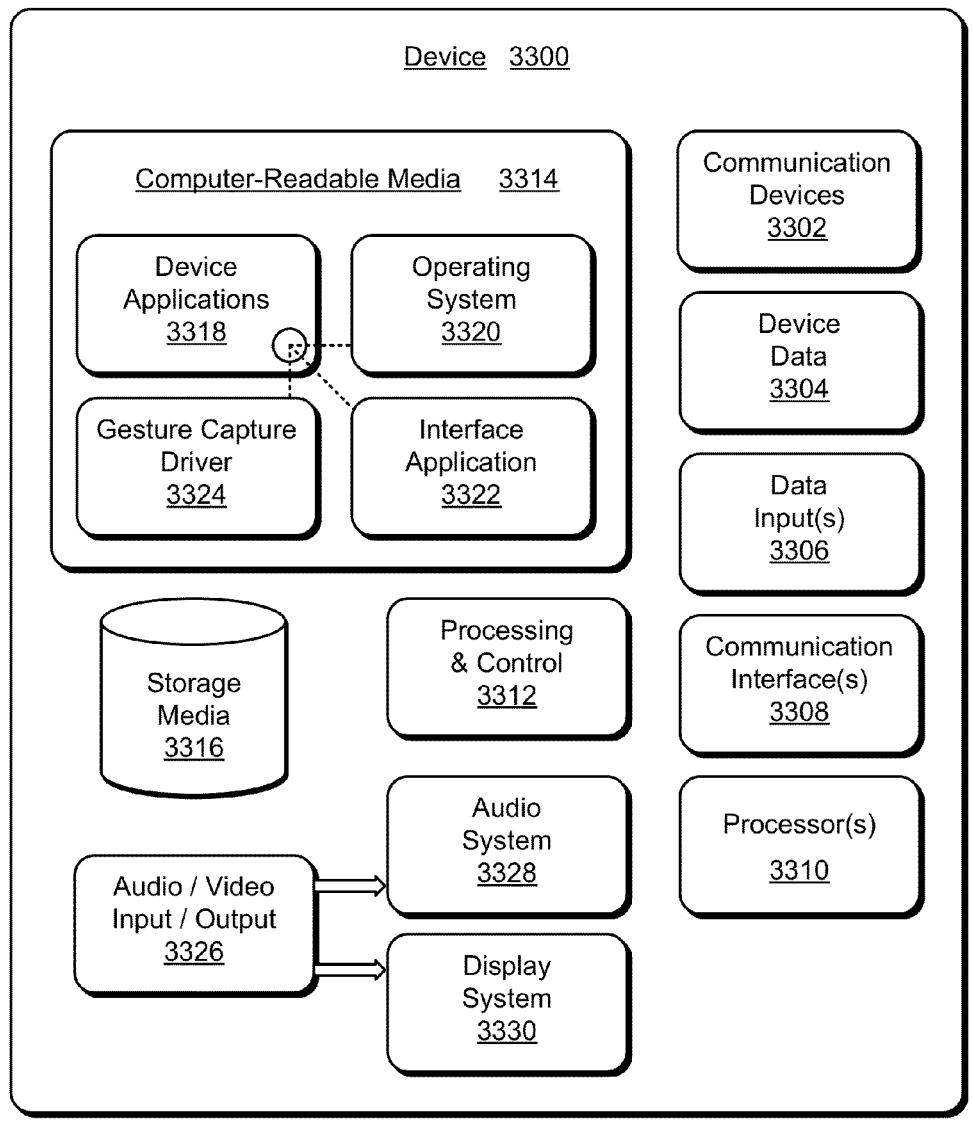
FIG. 33 illustrates an example computing device that can be utilized to implement various embodiments described herein.

FIG. 33 illustrates various components of an example device 3300 that can be implemented as any type of portable and/or computer device as described with reference to FIGS. 1 and 2 to implement embodiments of the gesture techniques described herein. Device 3300 includes communication devices 3302 that enable wired and/or wireless communication of device data 3304 (e.g., received data, data that is being received, data scheduled for broadcast, data packets of the data, etc.). The device data 3304 or other device content can include configuration settings of the device, media content stored on the device, and/or information associated with a user of the device. Media content stored on device 3300 can include any type of audio, video, and/or image data. Device 3300 includes one or more data inputs 3306 via which any type of data, media content, and/or inputs can be received, such as user-selectable inputs, messages, music, television media content, recorded video content, and any other type of audio, video, and/or image data received from any content and/or data source.

Device 3300 also includes communication interfaces 3308 that can be implemented as any one or more of a serial and/or parallel interface, a wireless interface, any type of network interface, a modem, and as any other type of communication interface. The communication interfaces 3308 provide a connection and/or communication links between device 3300 and a communication network by which other electronic, computing, and communication devices communicate data with device 3300.

Device 3300 includes one or more processors 3310 (e.g., any of microprocessors, controllers, and the like) which process various computer-executable or readable instructions to control the operation of device 3300 and to implement the gesture embodiments described above. Alternatively or in addition, device 3300 can be implemented with any one or combination of hardware, firmware, or fixed logic circuitry that is implemented in connection with processing and control circuits which are generally identified at 3312. Although not shown, device 3300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 3300 also includes computer-readable media 3314, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 3300 can also include a mass storage media device 3316.

Computer-readable media 3314 provides data storage mechanisms to store the device data 3304, as well as various device applications 3318 and any other types of information and/or data related to operational aspects of device 3300. For example, an operating system 3320 can be maintained as a computer application with the computer-readable media 3314 and executed on processors 3310. The device applications 3318 can include a device manager (e.g., a control application, software application, signal processing and control module, code that is native to a particular device, a hardware abstraction layer for a particular device, etc.). The device applications 3318 also include any system components or modules to implement embodiments of the gesture techniques described herein. In this example, the device applications 3318 include an interface application 3322 and a gesture-capture driver 3324 that are shown as software modules and/or computer applications. The gesture-capture driver 3324 is representative of software that is used to provide an interface with a device configured to capture a gesture, such as a touchscreen, track pad, camera, and so on. Alternatively or in addition, the interface application 3322 and the gesture-capture driver 3324 can be implemented as hardware, software, firmware, or any combination thereof.

Device 3300 also includes an audio and/or video input-output system 3326 that provides audio data to an audio system 3328 and/or provides video data to a display system 3330. The audio system 3328 and/or the display system 3330 can include any devices that process, display, and/or otherwise render audio, video, and image data. Video signals and audio signals can be communicated from device 3300 to an audio device and/or to a display device via an RF (radio frequency) link, S-video link, composite video link, component video link, DVI (digital video interface), analog audio connection, or other similar communication link. In an embodiment, the audio system 3328 and/or the display system 3330 are implemented as external components to device 3300. Alternatively, the audio system 3328 and/or the display system 3330 are implemented as integrated components of example device 3300.

CONCLUSION

Bezel gestures for touch displays have been described. In at least some embodiments, the bezel of a device is used to extend functionality that is accessible through the use of bezel gestures. In at least some embodiments, off-screen motion can be used, by virtue of the bezel, to create screen input through a bezel gesture. Bezel gestures can include single-finger bezel gestures, multiple-finger/same-hand bezel gestures, and/or multiple-finger, different-hand bezel gestures.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
receiving a bezel gesture input relative to a page displayed on a display device associated with a device, the bezel gesture input having:
a first portion that occurs only on a bezel of the device,
a second portion that occurs only on the display device and moves in an initial direction,
a third portion that exits the display device in a direction opposite the initial direction, and
the device being configured to sense the input portion that occurs only on the bezel,
the first portion, the second portion, and the third portion defining a continuous sliding bezel gesture and the first portion, the second portion, and the third portion occurring at separate times;
ascertaining page manipulation functionality associated with the bezel gesture input; and
accessing ascertained page manipulation functionality.

2. The method of claim 1, wherein the page manipulation functionality comprises creating a dog-ear on a page.

3. A system comprising:
one or more processors; and
a memory having instructions executable by the one or more processors to perform operations comprising:
receiving, on a device, a continuous sliding bezel gesture input relative to a page, the device being configured with one or more sensors to detect touch input that occurs only on an associated bezel;
recognizing a first portion of the continuous sliding bezel gesture input that occurs only on a first portion of the bezel, a second portion of the continuous sliding bezel gesture input that occurs only on a display device of the device, and a third portion of the continuous sliding bezel gesture input that occurs only on a second portion of the bezel across the display device from the first portion of the bezel;
saving the page responsive to receiving the continuous sliding bezel gesture input.

4. The system of claim 3, the operations further comprising:
receiving an additional bezel gesture input; and
responsive to receiving the additional bezel gesture input, exposing one or more tabs associated with a document.

5. The method of claim 1, further comprising initiating the continuous sliding bezel gesture on a corner of the bezel of the device.

6. The method of claim 1, further comprising initiating the continuous sliding bezel gesture on a location of the bezel of the device other than a corner of the bezel of the device.

7. The method of claim 1, the continuous sliding bezel gesture further comprising a fourth portion that occurs on the bezel of the device and occurs after the first portion, the second portion, and the third portion.

8. The method of claim 2, wherein creating a dog-ear comprises displaying a portion of the page differently than the rest of the page.

9. The system of claim 3, the operations further comprising reducing the page to a thumbnail as part of said saving.

10. The system of claim 3, wherein the device has separate display screens.

11. The system of claim 10, wherein said saving is performed relative to a spine separating the display screens.

12. The system of claim 3, the operations further comprising displaying another page during the second portion of the continuous sliding bezel gesture.

13. The system of claim 12, wherein the continuous sliding bezel gesture input moves rightward and the other page is a previous page.

14. The system of claim 12, wherein the continuous sliding bezel gesture input moves leftward and the other page is a next page.

15. A system comprising:
one or more processors;
a memory having instructions executable by the one or more processors to perform operations comprising:
receiving a bezel gesture input relative to a page displayed on a display device associated with a device, the bezel gesture input having:
a first portion that occurs only on a bezel of the device,
a second portion that occurs only on the display device and moves in an initial direction,
a third portion that exits the display device in a direction opposite the initial direction, and
the device being configured to sense the input portion that occurs only on the bezel,
the first portion, the second portion, and the third portion defining a continuous sliding bezel gesture and the first portion, the second portion, and the third portion occurring at separate times;
ascertaining page manipulation functionality associated with the bezel gesture input; and
accessing ascertained page manipulation functionality.

16. The system of claim 15, wherein the page manipulation functionality comprises creating a dog-ear on a page.

17. The system of claim 15, the operations further comprising initiating the continuous sliding bezel gesture on a corner of the bezel of the device.

18. The system of claim 15, the operations further comprising initiating the continuous sliding bezel gesture on a location of the bezel of the device other than a corner of the bezel of the device.

19. The system of claim 18, wherein creating a dog-ear comprises displaying a portion of the page differently than the rest of the page.

20. The system of claim 15, the continuous sliding bezel gesture further comprising a fourth portion that occurs on the bezel of the device and occurs after the first portion, the second portion, and the third portion.

* * * * *